United States Patent [19]

Kanoi et al.

[11] Patent Number: 5,963,457
[45] Date of Patent: Oct. 5, 1999

[54] ELECTRICAL POWER DISTRIBUTION MONITORING SYSTEM AND METHOD

[75] Inventors: Minoru Kanoi, Tokai-mura; Yuzuru Imamura, Hitachi; Saburou Yasukawa, Hitachinaka; Kiyoji Iwashita, Hitachi; Toru Takei, Hitachinaka; Hiroyuki Kudo, Hitachi; Junzo Kawakami, Mito; Kazuo Nishijima, Hitachinaka; Hiroshi Inoue, Hitachi, all of Japan

[73] Assignee: Hitachi, Ltd., Tokyo, Japan

[21] Appl. No.: 08/403,434

[22] Filed: Mar. 14, 1995

[30] Foreign Application Priority Data

Mar. 18, 1994 [JP] Japan .................................. 6-048239

[51] Int. Cl.⁶ ............................ G01R 21/06; G05B 15/02
[52] U.S. Cl. ............................ 364/528.26; 364/528.21; 340/870.03; 340/825.06
[58] Field of Search ............................ 307/31–41, 59–63, 307/115, 126, 130, 131; 364/139, 132, 528.21, 528.28, 528.26; 702/62, 58, 63, 66

[56] References Cited

U.S. PATENT DOCUMENTS

| 3,708,684 | 1/1973 | Breitmeier | 307/35 |
|---|---|---|---|
| 4,075,699 | 2/1978 | Schneider et al. | 364/528.26 |
| 4,167,679 | 9/1979 | Leyde et al. | 364/528.3 |
| 4,313,081 | 1/1982 | Smith | 323/209 |
| 4,370,562 | 1/1983 | Palazzetti et al. | 307/38 |
| 4,714,893 | 12/1987 | Smith-Vaniz et al. | 324/126 |
| 4,728,887 | 3/1988 | Davis | 324/127 |
| 4,746,241 | 5/1988 | Burbank, III | 403/344 |
| 4,796,027 | 1/1989 | Smith-Vaniz | 340/870.03 |
| 4,808,917 | 2/1989 | Fernandes et al. | 324/127 |
| 5,181,026 | 1/1993 | Granville | 340/870.28 |
| 5,233,538 | 8/1993 | Wallis | 702/62 |
| 5,247,454 | 9/1993 | Farrington et al. | 702/62 |
| 5,297,015 | 3/1994 | Miyazaki et al. | 363/146 |
| 5,341,088 | 8/1994 | Davis | 324/106 |
| 5,426,360 | 6/1995 | Maraio et al. | 324/126 |

FOREIGN PATENT DOCUMENTS 60-53528  11/1985  Japan .
6-24328  3/1994  Japan .

OTHER PUBLICATIONS

E. Handschin et al: "Bus Load Modeling and Forcasting", IEEE Transaction on Power Systems, vol. 3, No. 2, May 1988.

C.S. Chen et al: "Energy Loss Reduction by Critical Switches", IEEE 92 SM 502–5 PWRD, 1992.

*Primary Examiner*—James P. Trammell
*Assistant Examiner*—Cuong H. Nguyen
*Attorney, Agent, or Firm*—Fay, Sharpe, Beall, Fagan, Minnich & McKee

[57] ABSTRACT

An electrical power distribution monitoring system is provided for a power distribution line having a plurality of sections with a plurality of electrical loads connected to the power distribution line to form a power distribution network. The monitoring system has at least one sensor for at least one present electrical value at at least one point of the network, and estimates electrical values for at least one section of the line in dependence on both of present electrical values measured by the sensor and data relating to past power consumption by loads connected to the line. Improved prediction of actual conditions in the distribution line can be obtained.

31 Claims, 16 Drawing Sheets

$\delta_{V1}$ : VOLTAGE DEVIATION DEGREE $\delta_{V1} = (V_1 - V_b)/V_b$ $V_1$ : SECTION VOLTAGE $V$ : REFERENCE VOLTAGE $P_{V1}$ : PENALTY VALUE

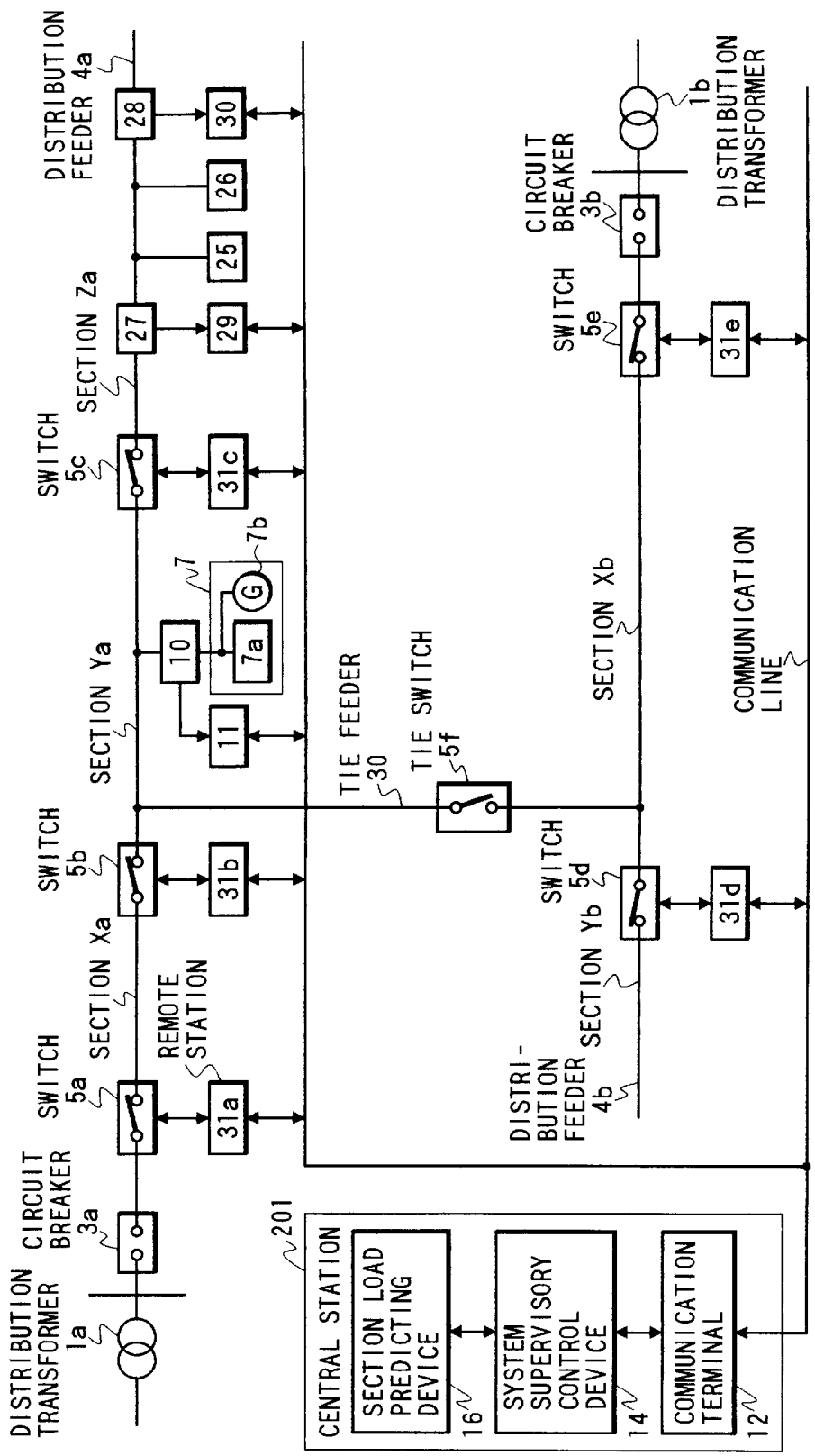

ELECTRICAL POWER DISTRIBUTION MONITORING SYSTEM AND METHOD

BACKGROUND OF THE INVENTION

1. Field of the Invention

The present invention relates to a supervising or monitoring system and a supervising or monitoring method for an electrical power distribution system, particularly a public utility electrical power distribution system providing power to a plurality of consumers which typically are domestic, commercial and industrial. The aim of monitoring is to provide information for improved control of the distribution system.

2. Description of the Related Art

Methods have been proposed in which past power loads are analyzed by classification of commercial areas, residential areas and the like, for the purpose of controlling a distribution system. Power loads of distribution feeders (distribution lines) or respective sections of the distribution feeders are predicted from the past record of their power consumption. See E. Handschin et al.: "Bus Load Modelling and Forecasting", IEEE Transaction on Power Systems, Vol. 3, No. 2, May 1988 and C. S. Chen et al.: "ENERGY LOSS REDUCTION BY CRITICAL SWITCHES", IEEE 92 SM 502-5 PWRD, 1992).

Similarly, JP-B-60-53528(1985) discloses a method of predicting currents by proportionally distributing a transmitting current of a distribution feeder to respective sections by using previously memorized power demand amount curves for weekdays and for holidays with respect to the sections.

Further, conventional supervisory technologies, using electrical values which are obtained by predicting the load or the current, are limited to local improvements in which operationally inappropriate conditions are treated in a symptomatic way.

The present inventors believe that there are the following problems in these methods.

(1) Since a power load curve is employed which has been obtained previously by measurement or the like, in the case where an electric facility connected to a distribution feeder, especially an electric facility having a large capacity, is in an irregular and unpredicted operational state which is different from the power load curve (for instance, when there occurs a special holiday of a factory, a breakdown of large equipment or the like), the prediction error is significantly increased.

(2) Recently, cases have increased wherein dump power is supplied to a distribution feeder mainly by a factory having a power generating facility or the like. In this case, since the value of the dump power changes at any time according to the situation in the factory, the supervisory method in which the power load curve has previously been established becomes inappropriate.

(3) It has been an assumption that the flow direction of power (power tidal flow direction) is only one-directional flow from a higher level power network to a lower level power network. Therefore, when a large amount of dump power is supplied from factories and the like to distribution feeders in the future, there will be many cases wherein power flows towards a higher level power network, and it is difficult to predict electrical values with high accuracy by the conventional technologies which do not consider the power flow in both directions.

(4) In conventional supervisory control technologies, there has been no recognition of sampling of portions necessitating improvement in a general way, and there has been no technology of sampling an operational state (for instance, excessive voltage drop, increase in transmission loss, increase in harmonics) of a system to be improved with priority, as a whole, and therefore, the improvement of the operational state of a system has often been carried out locally. As a result, the improvements have not necessarily been performed in a manner having a large improvement effect, and from this point of view, the promotion of improvement efficiency is desired.

(5) It is not possible to specify the cause of a deterioration of the operational state, since the operational state of a system is not grasped in a broad view.

SUMMARY OF THE INVENTION

It is an object of the present invention, in view of the above analysis, to provide a power distribution system capable of predicting with greater accuracy the operational state of the distribution system, to enable improved control thereof.

According to the invention in one aspect, there is provided an electrical power distribution monitoring system, for a power distribution line having a plurality of sections and having a power input at one end, there being a plurality of electrical loads connected to the power distribution line to form a power distribution network. The monitoring system comprises:

(a) at least one sensor for at least one present electrical value at at least one point of the network, (b) a data store containing data relating to past power consumption by loads connected to the line, and (c) calculating means arranged to estimate electrical values for at least one section of the line in dependence on both of a present electrical value measured by the sensor and the data in the data store.

Preferably the sensor is a power sensor arranged to measure power being supplied to said line at the power input thereto. There may be a power sensor and a plurality of power sensors, arranged to measure total power being supplied to said line. Particularly, there may be power sensor means arranged to measure power passing between the line and at least one specific load. The specific load may be selected as a load which on average consumes at least 5% of the total power consumption by all the loads connected to said line.

The calculating means is preferably arranged to use data from said data store for predicting power consumption by all loads connected to said line except the specific load or specific loads.

By measuring the input electricity amount to the distribution feeder, e. g. by measuring power between the input point of the distribution line and the load nearest to the input point or a branch point nearest to the input point, the total power passing from the higher level power network system to the distribution line can be measured in real time.

Further, the power being transmitted or received between at least one specific electrical load and the distribution line can simultaneously be measured in real time.

Administrative information, such as contract demand or past power consumption with respect to loads connected to the distribution line, is held by an administrative information forming device (data store), and predicted values of the power consumption amounts of the respective sections of the distribution line are calculated from the stored data and the real time measurements.

In another aspect, the invention provides an electrical power distribution monitoring system, for a power distribution line having a plurality of sections and having a power input at one end, there being a plurality of electrical loads connected to the power distribution line. The monitoring system comprises:

(a) measurement means for measuring an electrical value at at least one of (i) a point on said line, (ii) a selected one of the loads and (iii) a selected group of the loads, (b) a data store containing data relating to past power consumption by loads connected to the line, and (c) calculating means connected to the measurement means and to the data store and arranged to calculate estimated electrical values in at least one section of the line from both of a currently measured electrical value or values obtained by the measurement means and the data in the data store.

The calculating means may be arranged further to calculate, from estimated electrical values in a plurality of said sections, the degree of deviation of said estimated electrical values from respective predetermined standard values.

For example deviation from a predetermined allowable voltage range or value, which is an evaluation value obtained by calculating the section voltage value from the power flow of the section, is converted by using a voltage deviation penalty function. The resultant voltage penalty information is handled by a monitoring means whereby the degree of necessity of some improvement (performance index) is obtained as a numerical value with respect to problematic portions. A bank monitoring sampling device samples portions necessitating improvement by using the performance index calculated in this way.

The invention further consists in a method of monitoring an electrical power distribution network which has a power distribution line having a plurality of sections and a power input at one end, there being a plurality of electrical loads connected to said line. The method comprises the steps of:

(a) measuring at least one present electrical value at at least one point of the network, and (b) calculating, from the measured present electrical value or values and from data relating to past power consumption by loads connected to the line, at least one estimated electrical value of at least one section of the line.

Step (b) may comprise calculating the estimated electrical values of a plurality of the sections of the line and the method may further comprise comparing each estimated electrical value with a predetermined standard value.

Yet further the invention provides a method of monitoring an electrical power distribution network which has at least one power distribution line providing power to a plurality of loads, comprising estimating the performance of the distribution line by calculating electrical values from at least one measured present electrical value of the network and from data relating to past power consumption by loads connected to the distribution line.

In yet another aspect, the invention provides a method of monitoring a power distribution system having at least one bus connected to a higher level power network through a transformer, and at least one bank of distribution lines each composed of a plurality of sections and connected to a common bus, comprising the steps of:

calculating a deviation rate from a predetermined allowable range for each section with respect to an electricity amount of the section;

calculating for each distribution line the deviation rates of the respective sections thereof;

forming an overall data body by statistically treating the deviation rates of the respective sections while storing deviation information of at least one large section deviation for each distribution line; and abbreviating the overall data body into summarized data by statistically treating the overall data of the respective distribution lines while holding portions of the overall data deviating from a predetermined numerical value or values, thereby monitoring the range or degree of deviation.

Electrical values referred to herein may be for example, voltage, current or power.

The distribution line to which the invention is applied may be longer than 1 km, in which case the benefits of the invention are particularly realized.

The terms "present electrical value" and "currently measured value" and the like refer to a value measured essentially at present, i.e. at the time when a supervising or monitoring operation is performed. "Past power consumption" refers to power consumed over a period in the past, for example a past period of at least three months. Of course, in the past, the exact nature of the loads connected to the distribution line may have been different.

The invention is applicable to single phase and polyphase distribution lines.

BRIEF DESCRIPTION OF THE DRAWINGS

Embodiments of the invention will now be described by way of non-limitative example, with reference to the accompanying drawings, in which:

FIG. 13 is a general diagram of an embodiment in which this invention is applied to distribution line supervision with switch control.

DESCRIPTION OF THE PREFERRED EMBODIMENTS

Figure 1A:
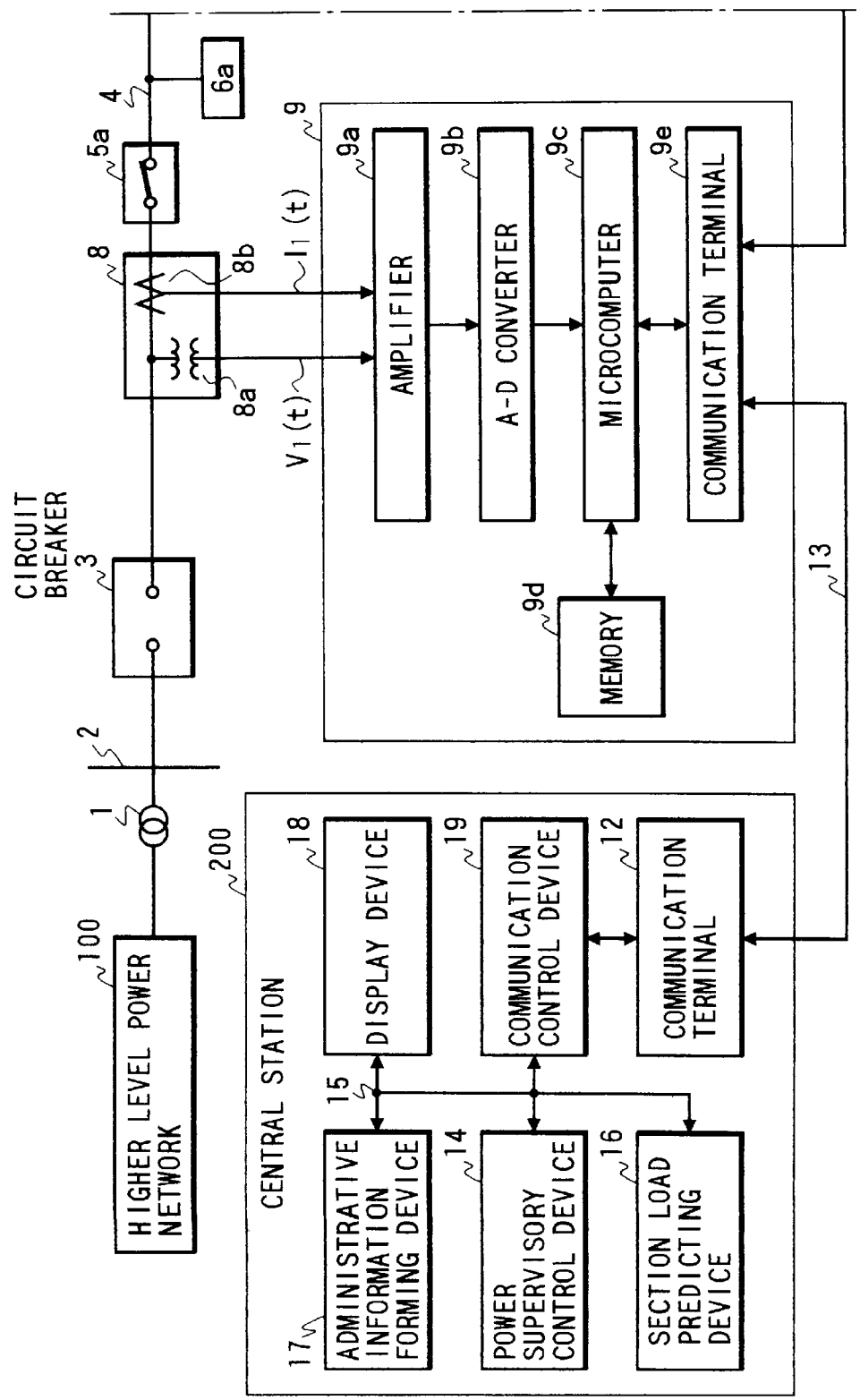
FIG. 1 is a general diagram of a distribution system monitoring device which is an embodiment of the present invention.

In the several drawings, the same reference numerals are used for the same or corresponding parts.

Figure 1B:
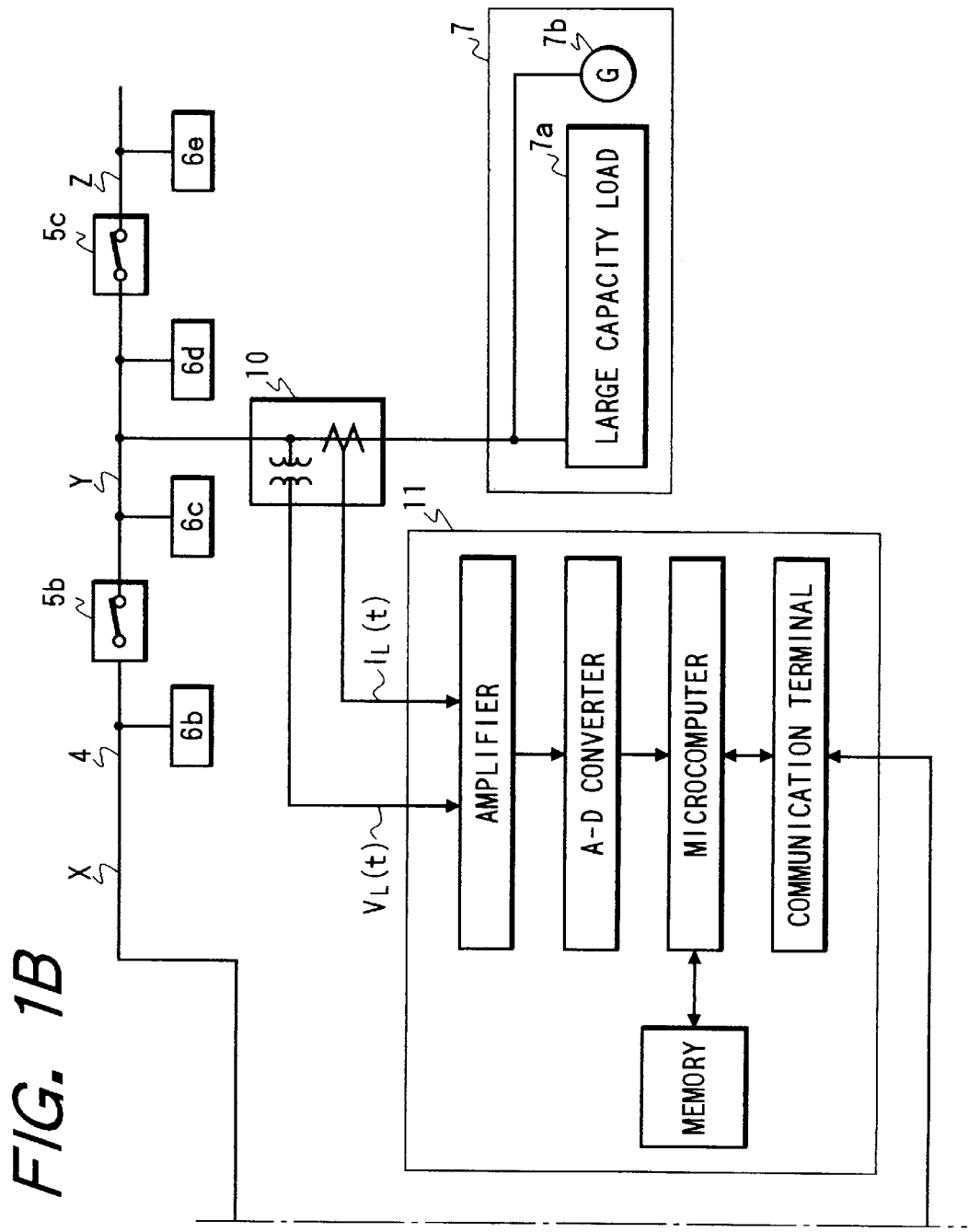

An explanation will be given with reference to FIG. 1 of a case wherein the present invention is applied to the supervising of a distribution voltage, as follows. In FIG. 1 a power distribution system is composed of a transformer 1 for converting the supply voltage from the voltage of a higher level power network 100 to a distribution voltage (e.g. 6600 V), a bus 2,. a power distribution line in the form of a distribution feeder 4 connected to the bus 2 through a circuit breaker 3, and switches 5a, 6b and 5c dividing the distribution feeder 4 into sections x, y and z. Although a case is shown wherein the sections of FIG. 1 are divided by the switches, generally a section may be defined as a portion which is divided by switches, point of change of the type of the distribution feeder, branch points of the distribution feeder or the like.

In this example, the transformer 1, the bus 2, the distribution feeder 4, etc. are generally arranged for three phases, but are shown by single lines in the drawing for simplicity. Further, although a plurality of distribution feeders are often connected to the bus 2, in this example only one distribution feeder 4 is shown. This distribution feeder is for example at a distribution voltage of 6600 V which is stepped down to the consumer voltage, e. g. 110 V, by transformers (not shown) for final distribution, in a conventional manner.

A plurality of consumer loads in the form of general electric facilities 6a through 6e are shown connected to the respective sections of the distribution feeder 4. These general electric facilities 6 are small-capacity electric facilities representative of which are domestic residences, small-scale shops or stores, offices and the like. Another load in the form of a specific electric facility 7 is also shown connected to the distribution feeder 4, this having a large-capacity load 7a and a power generating source 7b. As mentioned later, this specific electric facility 7 has a consumption which on average consumes not less than 5% of the total consumption of the loads on the distribution feeder 4, and the consumption power of the load 7 may be as high as 5% or more of the capacity of the feeder 4. In this example, although a case is shown wherein only one specific electric facility 7 is attached, a plurality of them may be attached.

In this example, a sensor device 8 is provided for measuring input power at a portion of the distribution feeder 4 between the power input end of the distribution feeder 4 and the load (general electric facility 6a in FIG. 1) which is nearest to the input end, or a branch point (not shown) which is nearest to the input end. An input end remote station 9 is attached to the sensor device 8. The sensor device 8 is composed of a voltage sensor 8a for measuring line voltage V1(t), and a current sensor 8b for measuring line current I1(t). The variable t shows that the measured amount changed with time t. The remote station 9 is composed of an amplifier 9a which is inputted with outputs of the voltage sensor 8a and the current sensor 8b, an AD-converter 9b which is inputted with the amplifier outputs, a microcomputer 9c which is inputted with outputs of the AD-converter 9b, a memory 9d which is connected to the microcomputer 9c, and a communication terminal 9e.

A sensor device 10 is attached to the interconnection line between the distribution feeder 4 and the specific electric facility 7 to measure the electricity amount which is passing between the specific electric facility 7 and the distribution feeder 4. The output of the sensor device 10 is inputted to a specific facility remote station 11. The constructions of the sensor device 10 and the remote station 11 are the same as those of the sensor device 8 and remote station 9 at the input end, and thus their explanations will not be repeated. The communication terminals of the remote stations 9 and 11 are connected to a communication terminal 12 of a central station 200 by a communication line 13. The communication terminal 12 is connected to a communication control device 19. The communication control device 19 is connected with a power system supervisory control device 14, a section load predicting device 16 for predicting an electricity amount of each section of the distribution feeder, an administrative information forming device 17 for forming administrative information with respect to the general electric facilities, and a display device 18.

Instead of exclusive communication lines, such as line 13, the distribution line 4 itself can be used for data transmission, in a known manner.

Figure 2A:
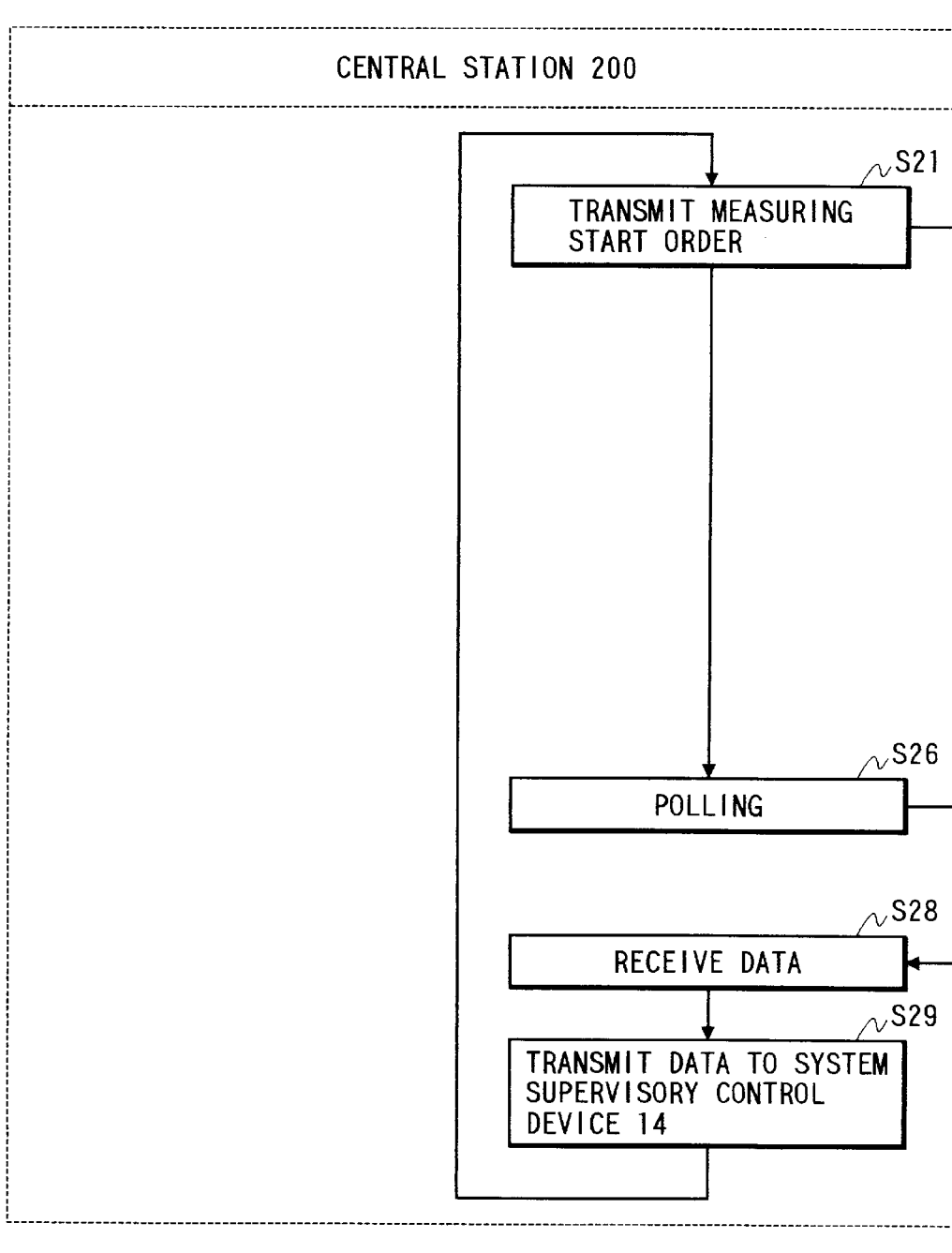
FIG. 2 is a diagram explaining the operations of a central station and remote stations in an embodiment of the present invention.
Figure 2B:
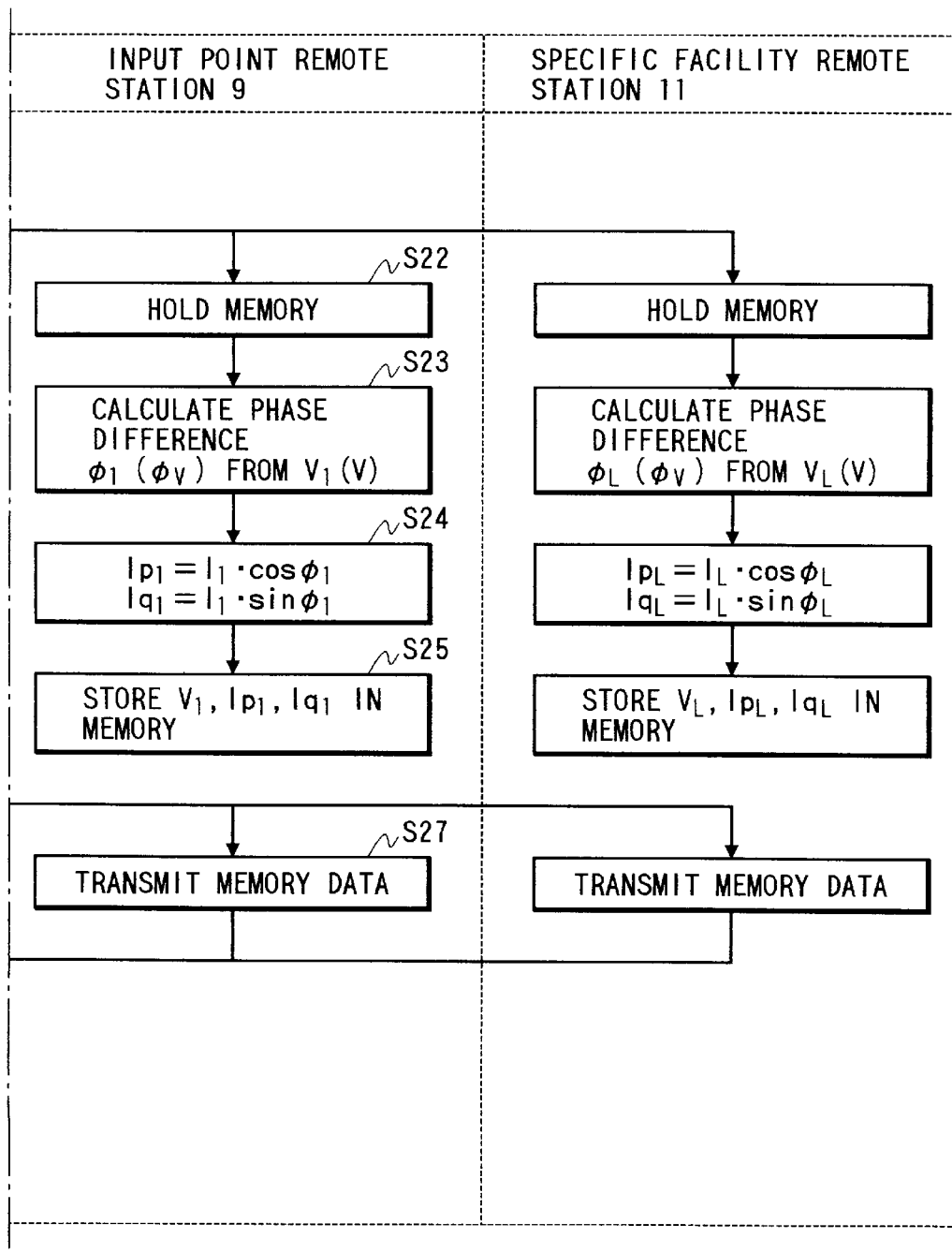

The operation of the central station 200 and the remote stations 9, 11 is given with reference to FIGS. 1 and 2. In FIG. 1, the memory 9d of the station 9 is repetitively written with waveform data of voltage and current which have been converted to digital values by the AD-converter 9b. In FIG. 2, in a first step (S21) the central station 200 transmits a measuring start order signal to the remote station 9 through the communication line 13. In the next step S22, when the respective remote stations receive the start order signal, the present waveform data V1(T1) and I1(T1) of the voltage and the current are held in the memory 9d. Then (step S23) from the memorized data V1(T1) and I1(T1), the phase difference $\phi 1$ therebetween is calculated by the microcomputer 9c. This phase difference calculation can be performed by using, for instance, a Fast Fourier Transform In step S24, an active current Ip1, and a reactive current Iq1 at time T1 are calculated by using the phase difference $\phi 1$ and in step S25, the calculated results of Ip1 and Iq1 are stored in the memory 9d along with the voltage V1. In step S26, the central station 200, a certain time after transmitting the measuring start order, transmits a polling signal to the station 9. In step S27, on receiving the polling signal, the data in the memory 9d is transmitted from the station 9 to the central station 200, and in step S28, the data is received.

The operation of the specific facility remote station 11 is the same as that of the input end remote station 9, and thus its explanation will be omitted. In step S29, the received data is transmitted to the communication control device 19 along with the data from the specific facility remote station 11.

Figure 3:
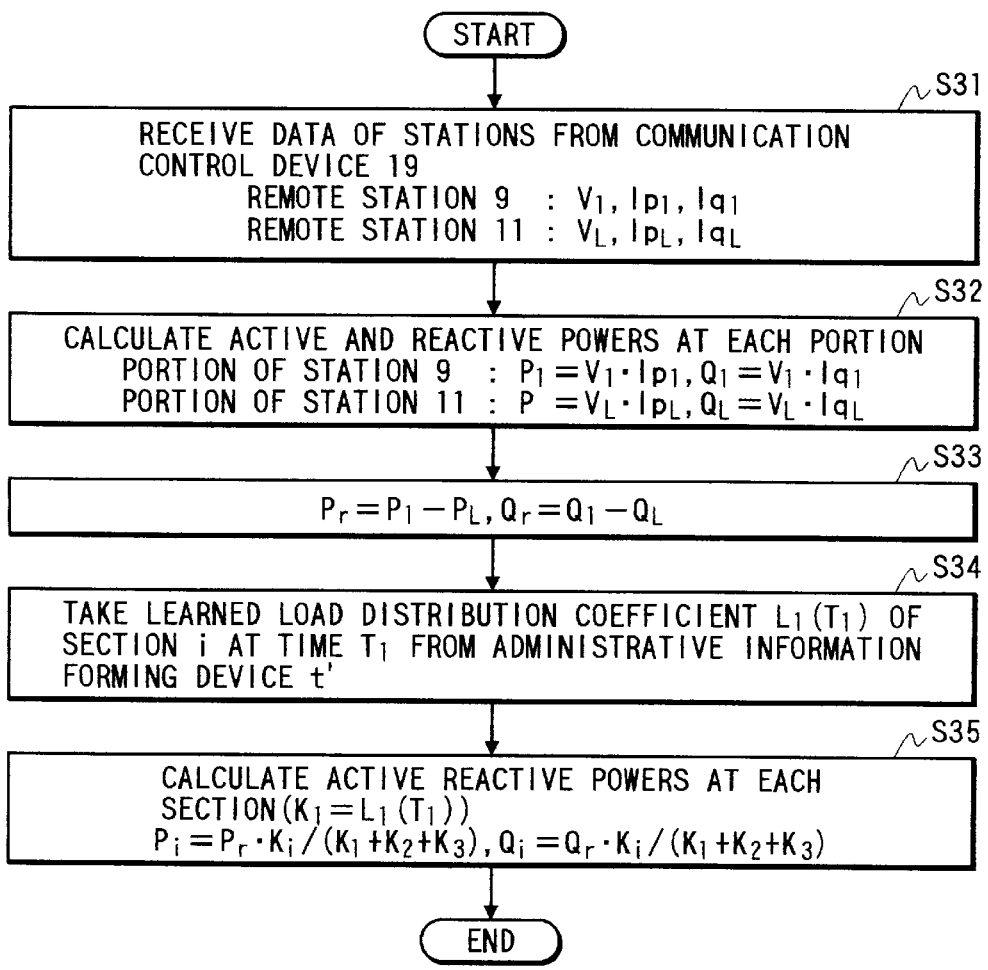
FIG. 3 is a diagram explaining the operation of a section load predicting device which is utilized in an embodiment of the present invention.

Next, an explanation will be given of the operation of the section load predicting device 16 with reference to FIG. 3. In step S31, the data of the respective remote stations 9, 11 are received from the communication control device 19. In step S32, the active and the reactive power values at portions wherein the remote stations are installed are calculated from the data received in step S31. The calculated P1 and Q1 are the active and reactive power values transmitted from the higher level power network to the distribution feeder 4 at the time T1 at which the central station 200 has transmitted the measuring start order signal, whereas PL and QL are the active and the reactive power values flowing to the specific electric facility 7 respectively at time T1. Further, the case where the power value is negative signifies that power flows in the reverse direction. In step S33, the differences Pr and Qr are calculated. Pr and Qr which have been calculated in step S33 are residues wherein P1 and Q1 that are the powers distributed to the distribution feeder 4 have subtracted from them PL and QL that are the power flows to the specific electric facility 7, and therefore are the total values of power flows to the other electric facilities connected to the distribution feeder, that is, the plurality of general electric facilities 6a through 6e. For the general electric facilities, although their individual consumption patterns are different more or less, since each of them has a small capacity and the number of them is large, as an average of the total, they have a characteristic wherein the same pattern is repeated with respect to every section, unlike the specifice electric facility or. Therefore, the repeated pattern of each section is previously established and Pr and Qr are distributed to each section in accordance with the established result.

In this embodiment, the learned load distribution coefficient Li(t) with respect to the section i is previously established by an administrative information forming device 17 through an off-line operation. In this example, Li designates an amount showing a power consumption rate for each section which is calculated from the past record of power consumption, and the variable t indicates that the load distribution coefficient is a function of time. An explanation will be given of the learning method later.

In step S34, the learned load distribution coefficients L1(T1), L2(T1) and L3(T1) for each section at time T1 are taken from the administrative information forming device 17 to the section load predicting device 16. Here, L1(T1), L2(T1) and L3(T1) are redefined as K1, K2 and K3. In step S35, the power values Pi and Qi at the section i at time T1 are calculated by proportional distribution of Pr and Qr among the respective sections by using the coefficients K1, K2 and K3. The powers of the general electric facilities of the respective sections which have been obtained here, do not include an unpredictable factor caused by some special situation of the specific electric facility 7 and real time date on the specific facility 7 is used. Therefore prediction is achieved with high accuracy. Further, the sign representing the direction of the power flow is included, and therefore the calculation can cope with the case wherein dump power is supplied from the electricity generating source 7b of the specific electric facility 7 to the distribution feeder 4. Further, when the load distribution coefficients are periodically and automatically learned as described later, the value of the coefficient is automatically updated, and therefore an effect can be achieved whereby time and labor for maintenance are saved.

Further, in the distribution system, a voltage variation of approximately 6% from a reference voltage Vb (for instance, 6,600 V) is allowable. If the actual measured electricity values of an electric facility having an equipment capacity of approximately 5% of the capacity of the distribution feeder are not provided, there arises an error of the voltage estimation value of about 5% with respect to a true voltage value. When the value is added to a measurement error or the like, the error may exceed the allowable value of 6%. In this embodiment of the invention, a facility having an electric equipment having a capacity of 5% of the capacity of the distribution feeder as mentioned above, is designated as the specific electric facility and is treated specially, to avoid this problem.

Further, when a local power generating source is installed at a distal end of the distribution feeder, there may arise a reverse power flow toward the bus, and there is a high possibility of generating an error of not less than 6% in the voltage prediction, and therefore, such a power source is subjected to measurement as a specific electric facility irrespective of its capacity.

Figure 4:
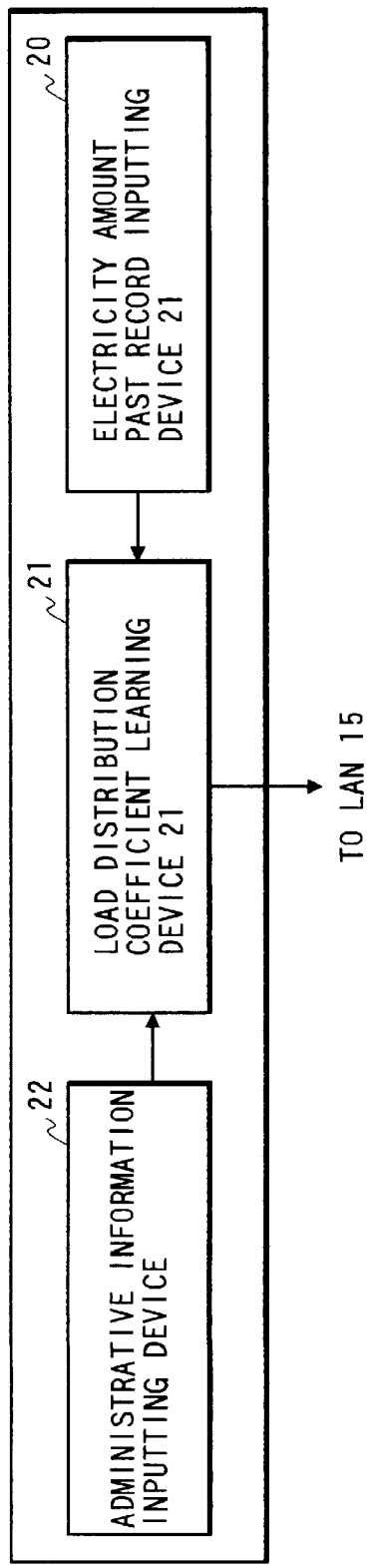
FIG. 4 is a diagram of operation of an administrative information forming device which is used in an embodiment of the present invention.

An explanation will be given of the construction of the administrative information forming device 17 with reference to FIGS. 4 and 5. As shown by FIG. 4, the administrative information forming device 17 is composed of an administrative information inputting device 22 which is inputted with administrative information concerning the distribution feeder 4 such as the kind and the number of facilities (office, general residence, store and the like), the contract demands of the respective facilities, time, day of week and the like, an electricity amount past record inputting device 20 which is inputted with the past record of electricity consumption at each section, and a load distribution coefficient learning device 21 connected thereto.

Figure 5:
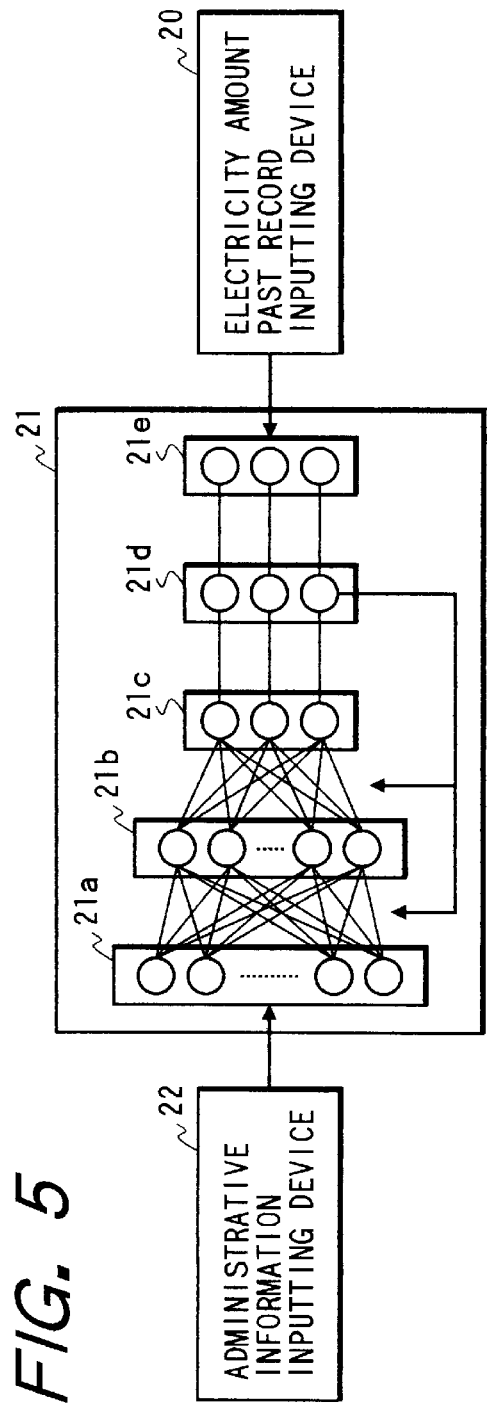
FIG. 5 is a diagram of a load distribution learning device which is used in an embodiment of the present invention.

As shown in FIG. 5, the load distribution coefficient learning device 21 comprises a so-called neural network composed of an input layer 21a, an intermediate layer 21b, an output layer 21c, a comparison layer 21d and a teacher signal layer 21e. The input layer 21a of the learning device 21 is inputted with the administrative information concerning the distribution feeder 4 such as the contract demands of the respective facilities as mentioned above from the inputting device 22. The teacher signal layer 21e is inputted with an actual load distribution coefficient which has been provided by the electricity amount past record from the electricity amount past record inputting device 20. With these inputs, the values of the load distribution coefficients of the respective sections which are outputted to the output layer 21c of the load distribution coefficient, are learned such that they are equal to the values of the load distribution coefficients of the teacher signal layer 21e. This type of learning operation is described in, for instance, "Introduction to Neurocomputers" pp. 42–43, June, 1992, edited by Ohm Company, and its explanation will be omitted. By the learning operation of the load distribution coefficient as above, the accuracy of the load distribution is promoted and the achievement of a highly accurate prediction of the section consumption power is made possible.

In this embodiment, an explanation has been given for an example wherein the load distribution coefficient is provided by learning. However, the coefficient may be calculated by using the power reference curve or the contract demand as in conventional cases.

Next, an explanation will be given of the operation of the system supervisory control device 14 with an example of a case wherein the line voltage of the distribution feeder 4 is supervised together with supervision of the voltage variation, the transmission loss, the harmonics increase and the like, with reference to FIG. 6. In step S41, an active current IPi, and a reactive current IQi passing through each section is calculated at time T1 by using the powers Pi and Qi of each section which are transmitted from the section load predicting device 16, and at the same time the line voltage is calculated by using line constants (ri: resistance, Xi: reactance) of a section i (which have previously been inputted), the active current IPi and the reactive current IQi, simultaneously.

In step S42, the line voltages at the respective sections are compared with a reference voltage Vb, and when the absolute value of the difference exceeds an allowable value Vth, in step S43 the section and the value of the line voltage are displayed in the display device 18. Since a variation width of 110V±6V is accepted for the allowable voltage variation as mentioned above, it is convenient to convert this to the distribution reference voltage 6600 V and to use 6600±360V or the like for Vth. When supervising the line voltage, the above operation is iterated at an interval of, for instance, 10 to 20 minutes.

Figure 7:
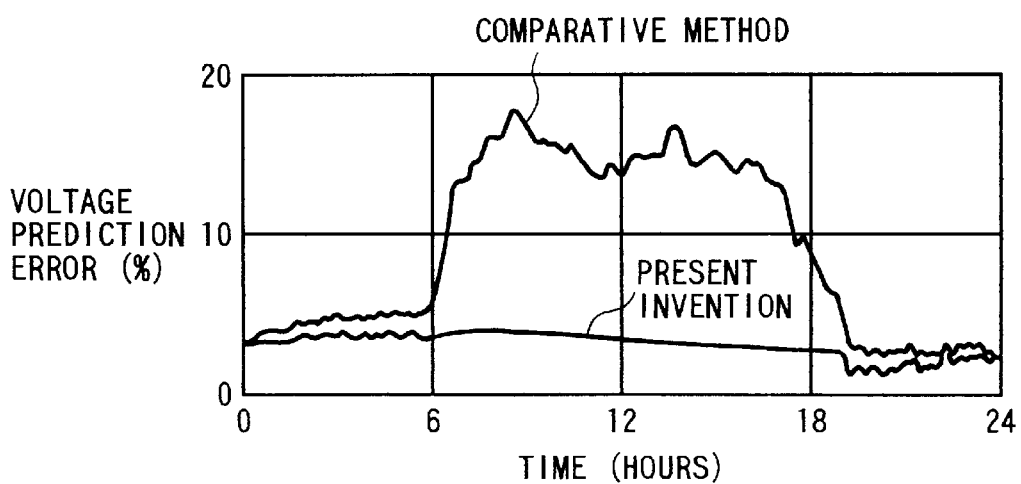
FIG. 7 is a diagram comparing the effect of an embodiment of the present invention with that of a comparative method.

FIG. 7 shows an example of improvement of voltage prediction accuracy by the above embodiment. In this example, an investigation has been made of the load power prediction accuracy during 24 hours in a case where a factory constituting a specific electric facility operates on a day that is originally designated a holiday due to a special situation. In the comparative method, a predetermined load pattern of a holiday is used for the specific electric facility, and therefore the prediction accuracy, especially in the day time when the equipment in the facility is operated, is poor. By contrast, with the load prediction by the present invention, the accuracy can be improved by four times as much as with the comparative method.

Figure 8:
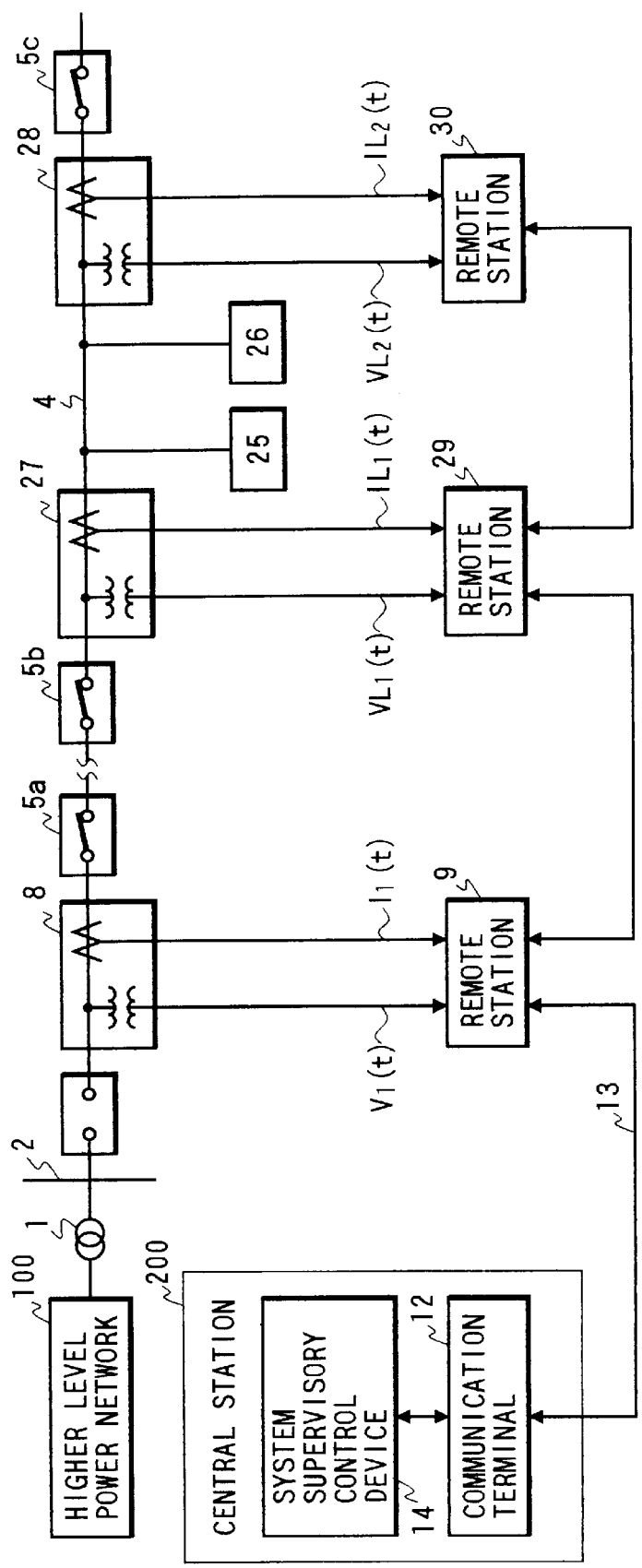
FIG. 8 is a diagrammatic view of the general construction of another embodiment according to the present invention.

FIG. 8 shows another embodiment of the present invention. In this example, a plurality of specific electric facilities 25, 26 are connected to the distribution feeder 4. Sensor devices 27, 28 similar to the sensor device 8 are installed on the distribution feeder 4 respectively closer to and further from the input end of the feeder than the connection points of these specific electric facilities 25, 26. The outputs of the sensor devices 27 and 28, i.e. measured values of voltage and current, are respectively inputted to remote stations 29 and 30. The respective remote stations are connected to the communication terminal 12 of the central station 200 by the communication line 13. The power values PL and QL at time T1, at which the main station 12 transmits a measuring start order signal, are calculated by the following equations:

$$PL = PL1 - PL2 \quad \text{(equation 1)}$$

$$QL = QL1 - QL2 \quad \text{(equation 2)}$$

where PL1 and PL are active power values calculated by the remote stations 29 and 30, respectively, and QL1 and QL2 are the reactive power values calculated by the remote stations 29 and 30, respectively. The values are respectively calculated by the following equations:

$$PL1 = VL1(T1) \cdot ILI(T1) \cdot \cos \phi 1 \quad \text{(equation 3)}$$

$$PL2 = VL2(T1) \cdot IL2(T1) \cdot \cos \phi 2 \quad \text{(equation 4)}$$

$$QL1 = VL1(T1) \cdot ILI(T1) \cdot \sin \phi 1 \quad \text{(equation 5)}$$

$$QL2 = VL2(T1) \cdot IL2(T1) \cdot \sin \phi 2 \quad \text{(equation 6)}$$

where $\phi 1$ is the phase difference between VL1(T1) and ILI(T1), $\phi 2$ is the phase difference between VL2(T1) and IL2(T1), T1 is the time of transmitting the measuring start order signal, VLI and ILI are the voltage and current values measured at the location of the remote station 29, and VL2(t) and IL2(t) are the voltage and current values measured at the location of the monitor station 30.

The processing after PL and QL have been calculated is the same as in the previous embodiment. In the present embodiment, in addition to the effect of improving the prediction accuracy of the load, an advantage is achieved that the sensor devices can be reduced to a small number since, even if the number of the specific electric facilities is increased, it is possible to measure the desired data by choosing the measurement locations on the distribution feeder 4 on either side of a group of these facilities.

The present invention will be further illustrated below with reference to FIG. 13 in connection with an example in which the present invention is applied to the control of switches. A power distribution system shown in FIG. 13 is composed of distribution transformers 1a and 1b, circuit breakers 3a and 3b connected thereto, a plurality (two in this embodiment) of distribution feeders 4a and 4b connected to the circuit breakers 3a and 3b, and a tie feeder 30 for trying the distribution feeders 4a and 4b. Here, on the distribution feeder 4a are mounted section switches 5a, 5b, and 5c, the distribution feeder 4a thus constituting sections Xa, Ya, and Za The section Ya is constituted by a tie switch 5f mounted on the tie distribution feeder 30 together with the section switches 5b and 5c. Further, on the distribution feeder 4b constructed likewise are mounted section switches 5e and 5d to define sections Xb and Yb. Here, only the tie switch 5f is operated in an open state even in ordinary time, in which case, the power distribution system is in a tree-like system for the sake of operation. Remote stations 31a to 31e for controlling the opening and closing are connected to the section switches 5a to 5e. The remote stations 31a to 31e are also connected to a system supervisory control device 14 through a comminication terminal 12 by a communication line 13. A memory (not shown) within the system supervisory control device 14 stores therein power of the sections obtained by the load predicting device 16, which has been explained in the previous embodiments.

Figure 14:
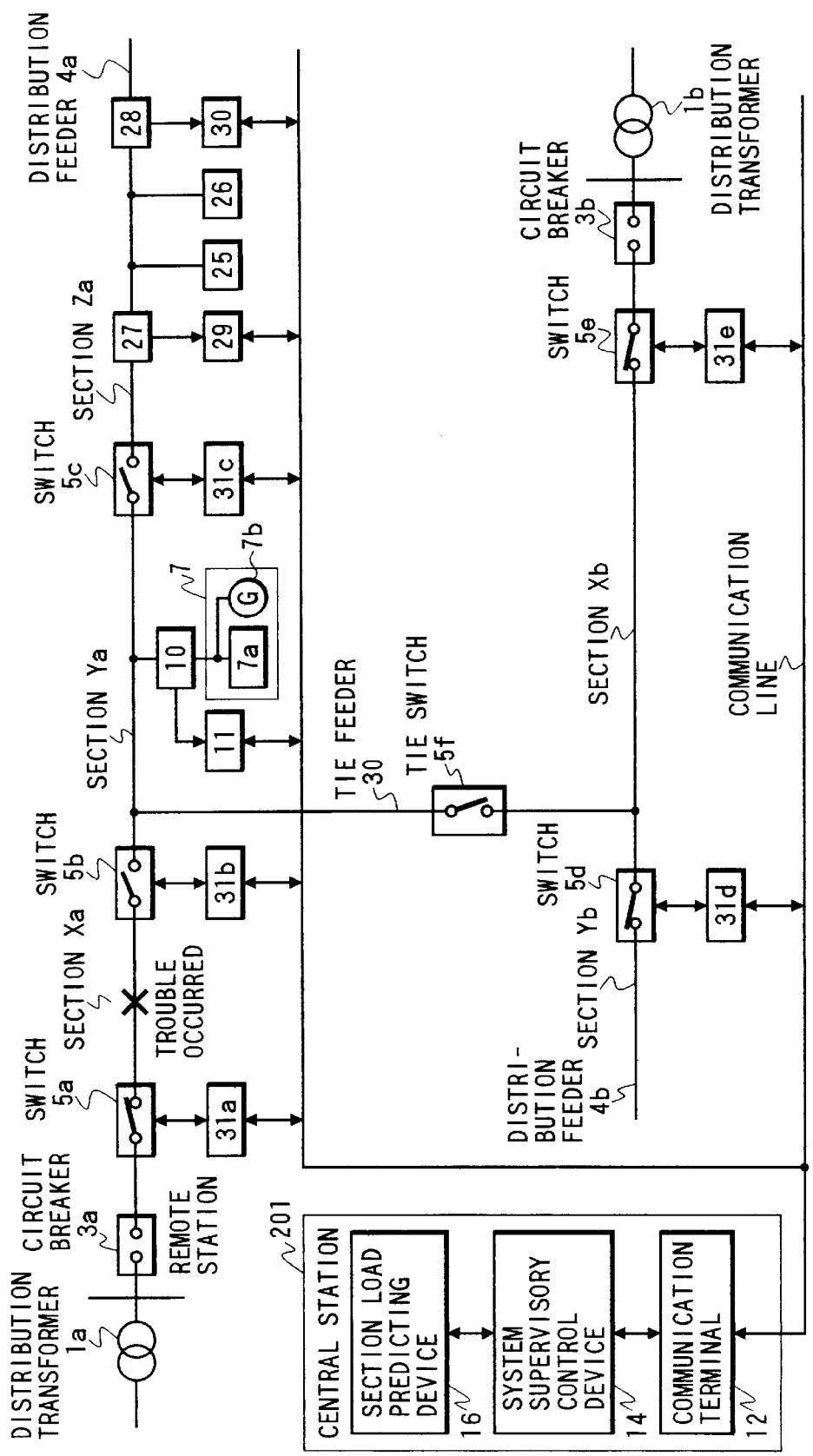
FIG. 14 shows the distribution system of FIG. 13 in a fault state.

The operation of the embodiment constructed as described above will be explained with reference to FIGS. 13 and 14. FIG. 14 shows the state immediately after the circuit breaker 3a provided in an input portion of the distribution feeder 4a is tripped by the operation of a protector (not shown) with the result that a fault occurs as indicated by X in the section Xa of the distribution feeder 4a for some cause. Generally, the switch mounted in the distribution feeder is kept closed in the state balanced with the force of a spring by an electromagnetic force which acts in the applied voltage state. Accordingly, in the state wherein the circuit breaker 3a is tripped as shown in FIG. 14, the switches 5a to 5c mounted in the distribution feeder 4a sequentially assume a no-voltage state. Thus, the switches are placed in an open state by the spring force, so that the entire distribution feeder 4a is placed in a power failure state. Thereafter, when the circuit breaker 3a is again closed, the switch 5a is closed by being acted with an electromagnetic force after passage of a suitable time, and power is again fed to section Xa. At this time, if the fault is naturally restored, the power failure is to be restored from the switches 5b and 5c and the power supply after passage of a suitable time.

On the other hand, when the fault continues, and the switch on the power supply side (in FIG. 14, the switch 5a) in the fault section is closed, immediately thereafter the circuit breaker 3a becomes tripped again. Therefore, determination is made that a fault occurs in the load section of the switch, and even if power is again fed, the switch 5a is locked so as not to be closed.

Thereafter, the circuit breaker 3a is once again closed so that power is restored to the section on the power supply side of the switch but the section on the load side from the fault section remains in the state of power failure. In the FIG. 14 example, all the sections except the section composed of the circuit breaker 3a and the switch 5a (in this section, no electric facility is installed) are in a power failure state. Thus, an emergency restoration measure of power failure in the section on the load side is carried out by the sys t em supervisory control device 14. This operation will be explained with reference to FIG. 15.

Figure 15:
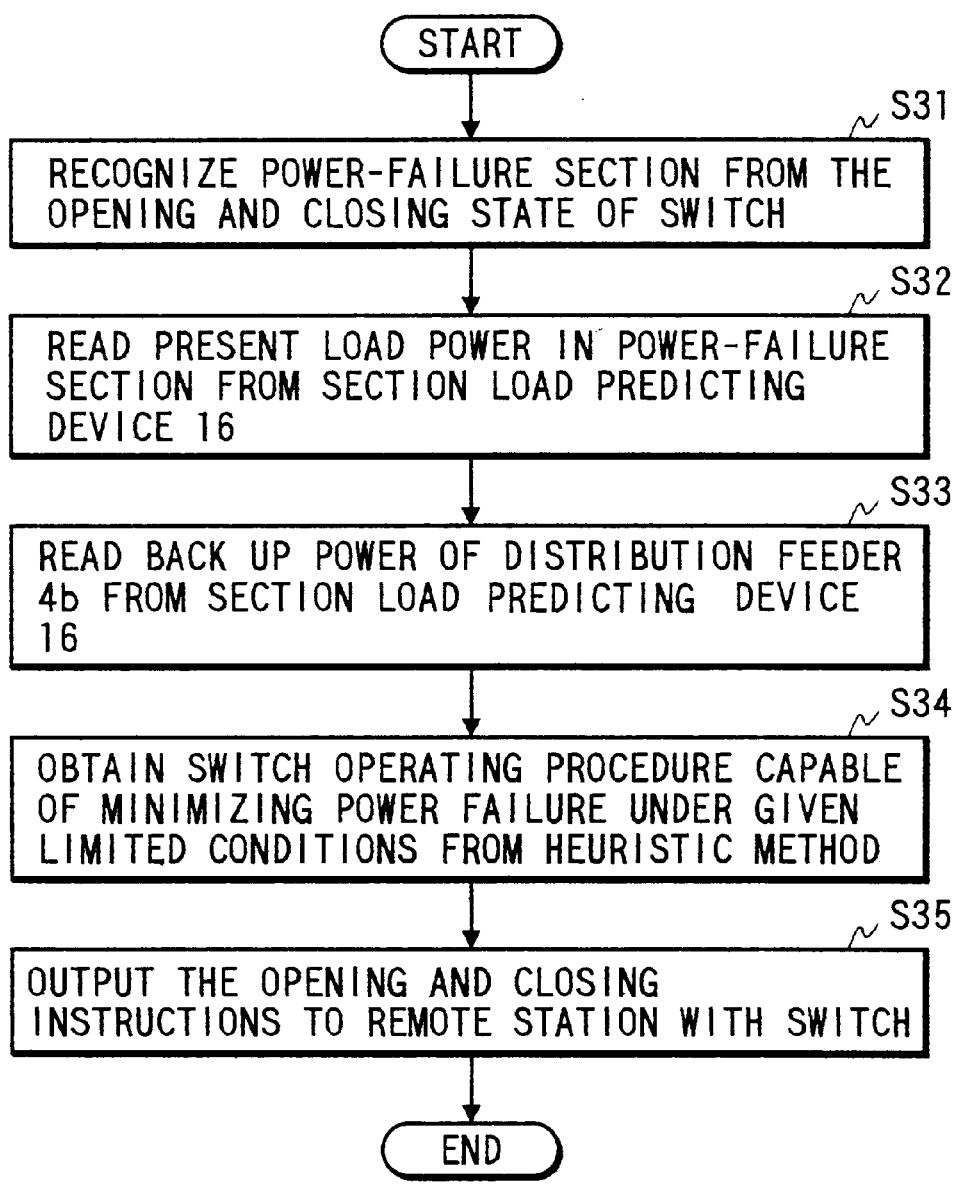
FIG. 15 is a diagram of fault control in the distribution system of FIGS. 13 and 14.

The control operation shown in FIG. 15 is started by transmitting information of tripping of the circuit breaker 3a to the system monitor control device 14 through the communication line 13 by a remote station for circuit breaker 3a (not shown). In S31, the section of power failure is recognized by the opening and closing information of the switch mounted distribution feeder. In S32, a load power in the power-failure section is read from the section load predicting device 16. At this time, the load power amount read is the load power (called a present load power amount) presumed immediately before the occurrence of the fault. In S33, a backup power of the normal distribution feeder 4b likewise obtained is read. In S34, a switch operating procedure is obtained in which power can be quickly fed and the range of power failure can be minimized by a procedure in which the switches are closed under some limited conditions on the basis of the load power amount in the power failure section read and the backup power of the distribution feeder 4b. For this procedure, a known procedure such as a heuristic process can be used.

The aforementioned limited conditions include a passing current limiting condition, an allowable voltage drop condition, and the like. The determination whether or not these conditions are fulfilled greatly depends on whether or not the load power in the power failure section and the backup power of the distribution feeder 4b are accurately presumed, similar to the case of obtaining the switch operating procedure whether or not the section of power failure can be minimized.

In the present invention, as explained in the previous embodiment, the load power in each section or the backup power amount of the normal distribution feeder can be obtained with accuracy by the load predicting device 16. In the system supervisory control 14, the thus obtained high-accuracy load power and backup power amount of the sound distribution feeder are used to determine the switch operating procedure, and therefore, it is possible to obtain a switch operating procedure which can reduce a section of power failure in an emergency manner within a short period of time without producing an excessive let-through current and with an allowable voltage drop. In S35, in accordance with the switch operating procedure obtained as described above, for example, in FIG. 14, the switch 5f is closed to feed power to the section Ya, and then the switch 5c is closed to feed power to the section Za, whereby the section on the load side in the section where trouble occurs which has been subject to power failure can be restored.

An explanation has been made of a case where the switch 5c can be closed to feed power also to the section Za. However, the opening and closing instructions are outputted to the switch sub-stations so that as the result of calculation using the load power amount and the preliminary power amount of the sound distribution feeder, for example, if an excessive passing current occurs in the distribution feeder 4b, power is supplied only to the section Ya, and power is supplied to the section Za separately from a normal distribution feeder which is not shown.

The above embodiments have illustrated the supervision of voltage. However, this invention is not limited to these examples and is applicable over a wide range such as switch control, overload monitoring, load control, power flow control, transmission loss reducing control and the like.

Figure 9:
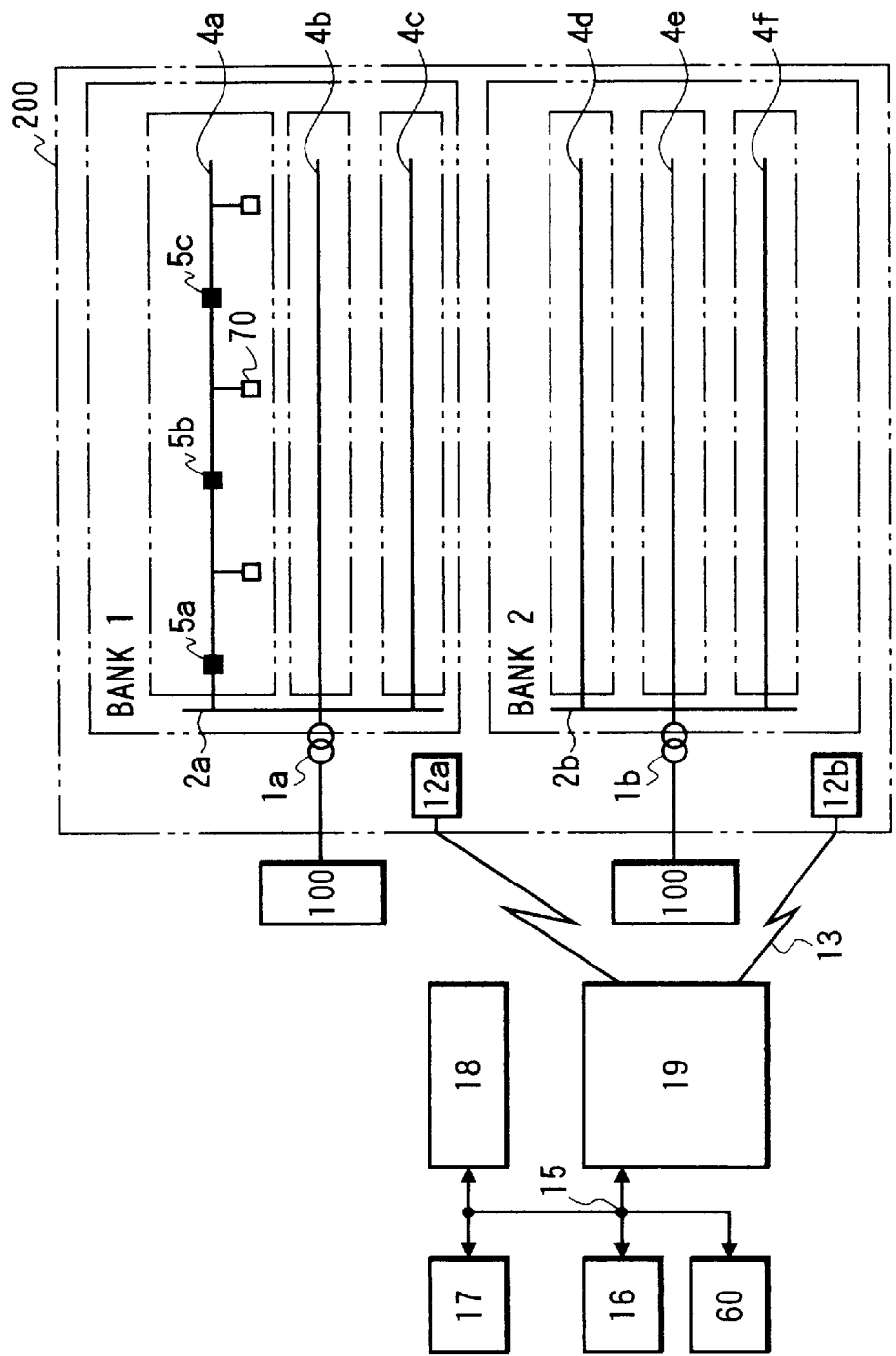
FIG. 9 is a general diagrammatic view of yet another embodiment of the present invention.

Next, a further embodiment of the present invention will be explained using FIG. 9. A distribution system 300 is composed of a plurality of distribution feeders 4a through 4f which are connected to higher level power networks 100 through transformers 1a and 1b. The distribution feeder 4a is divided into a plurality of sections by the switches, 5a, 5b and 5c, and a plurality of electric facilities 70 are connected to the respective sections. Here, the electric facilities 70 are general or specific electric facilities as explained above for the previous embodiments. The same applies for the other distribution feeders 4b through 4f, and their explanations will thus be omitted.

The electricity passing at the input point from a bus 2a to the distribution feeder 4a and the electricity passing between the distribution feeder and the specific electric facilities is measured, and transmitted to main stations 12a and 12b through the communication lines, not shown. The main stations 12a and 12b are connected to the communication controlling device 19 through the communication line 13. This is similar to the embodiment of FIG. 1 and illustration and explanation therefore will thus be omitted. The communication controlling device 19 is connected with a hierarchy type system monitoring device 60, the section load predicting device 16 for predicting the electricity values of the sections of the distribution feeders, the administrative information forming device 17 for forming the administrative information concerning the general electric facilities, and the display device 18.

The branch-like distribution system as shown in the distribution system 300 has sections as minimum units, a plurality of sections connected together forming the distribution feeder, and a plurality of distribution feeders connected to the same bus taken together forming one group called a bank. This embodiment illustrates the application of the invention to such a hierarchy structure of the general distribution system. The banks constructed by the distribution feeders connected to the buses 2a and 2b are respectively designated as #1 and #2.

Figure 10:
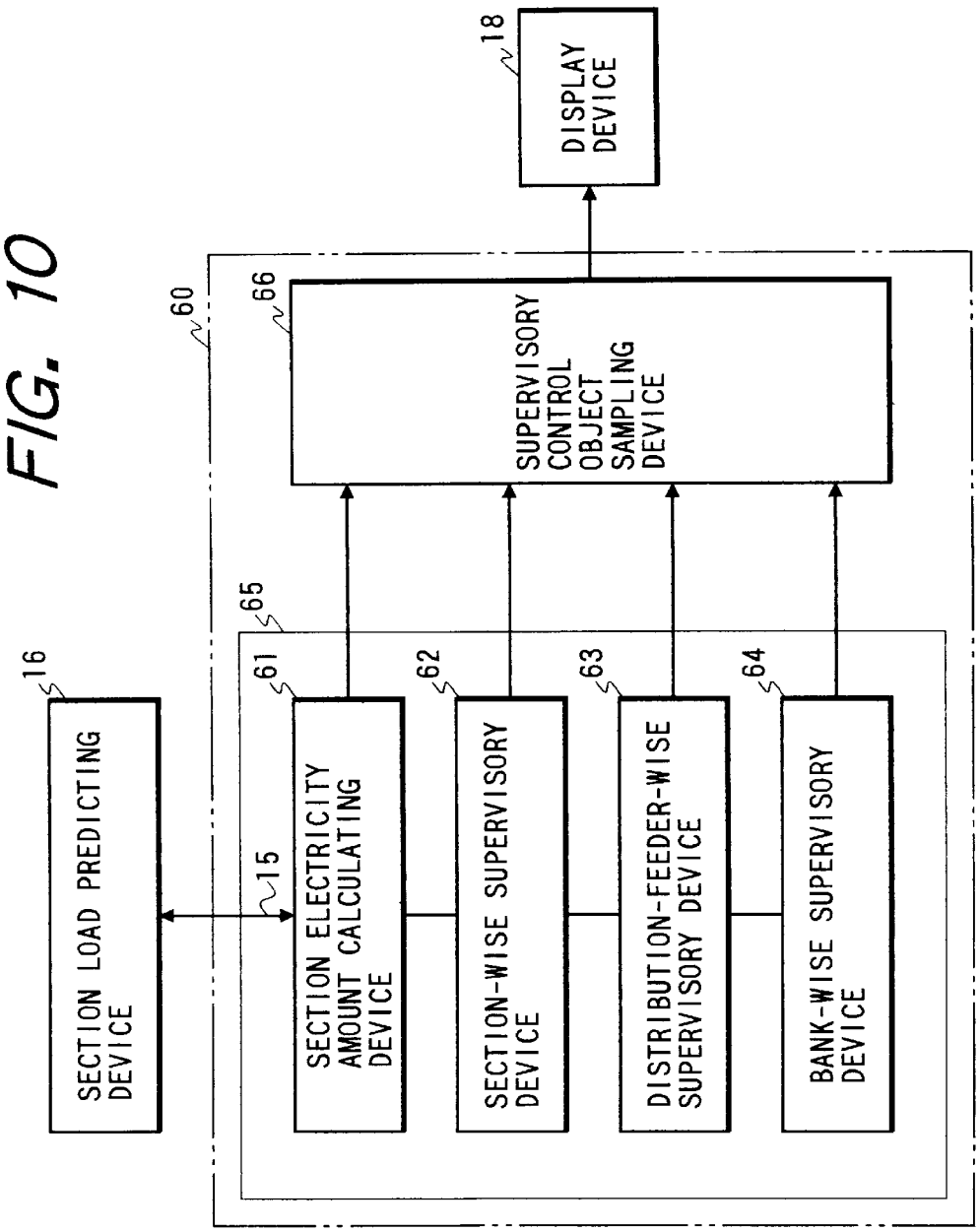
FIG. 10 is a diagram of a system monitoring device which is used in the present invention.

The hierarchy type system supervisory device 60, which is a key component of this embodiment of FIG. 10, is composed of a section electricity amount calculating device 61 which is connected to the section load predicting device 16 through LAN15, a section-wise supervising device 62 connected thereto, a distribution-feeder-wise supervising device 63 connected thereto, a bank-wise supervising device 64, and a supervising control object sampling device 66 which is inputted with outputs from the section-wise supervising device 62, the distribution-feeder-wise supervising device 63 and the bank-wise supervising device 64. The supervisory control object sampling device 66 is connected to a display device 18.

Figure 11:
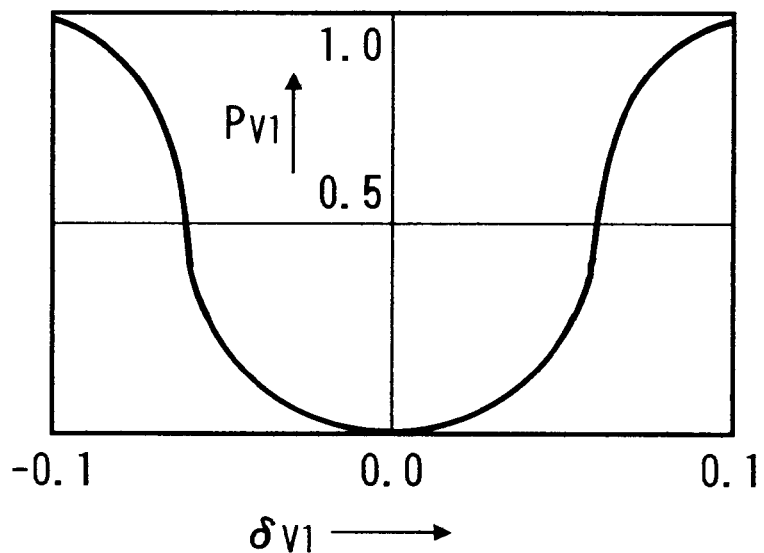
FIG. 11 shows an example of a voltage penalty function which may be used in the present invention.
Figure 12A:
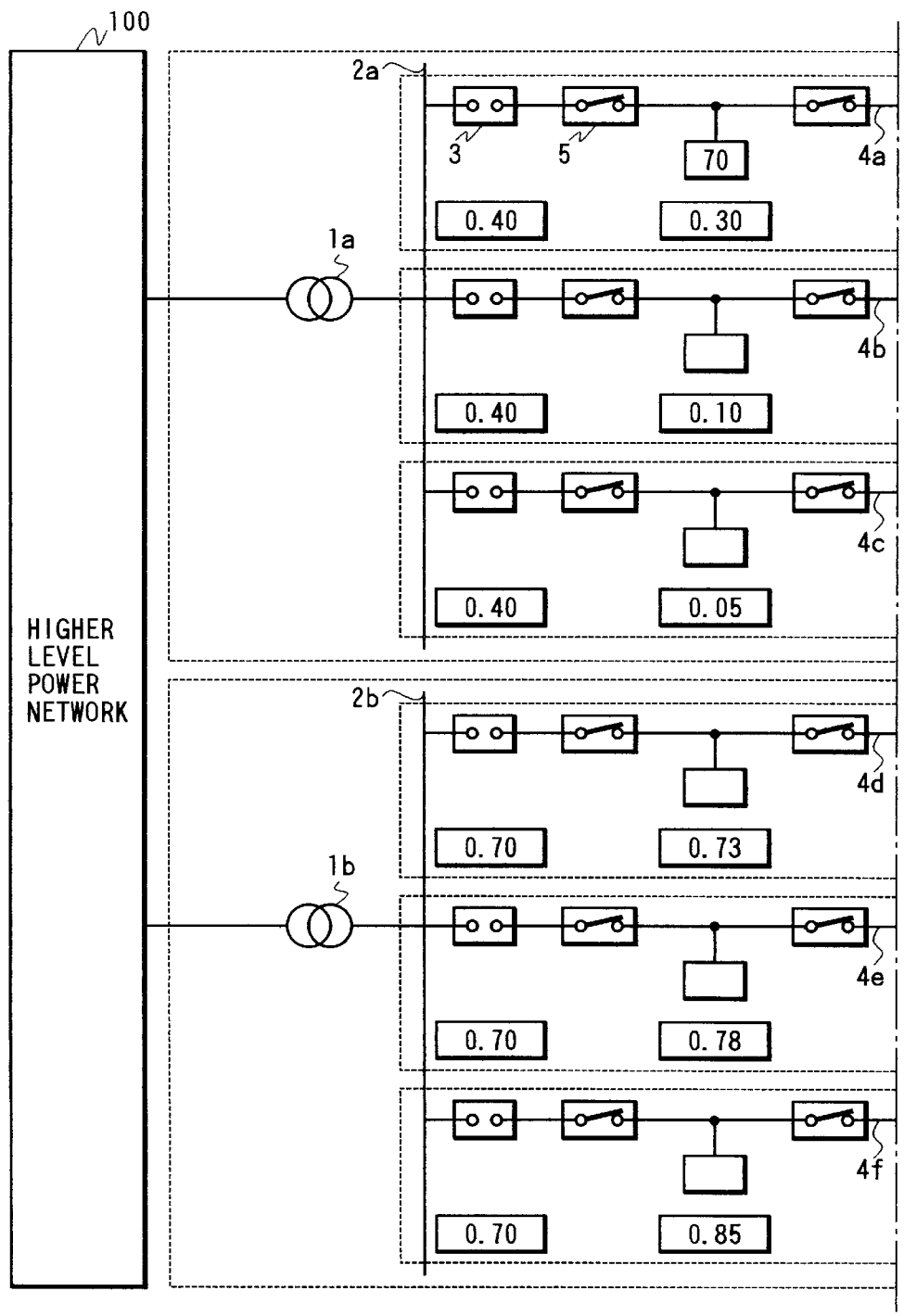
FIG. 12 is an explanatory view of a system monitoring device which may be used in the present invention.
Figure 12B:
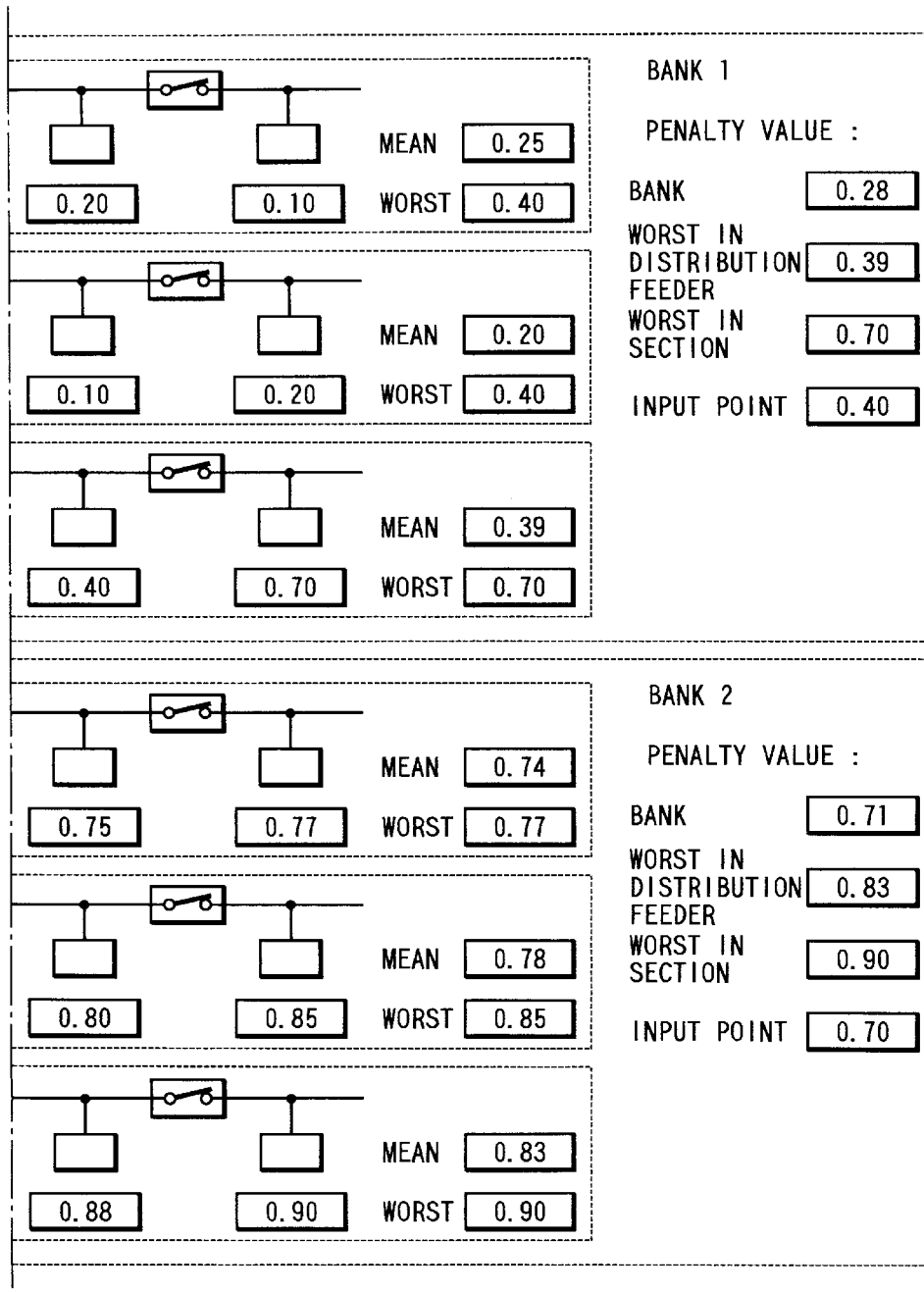

The operation of the hierarchy type system supervisory device 60 is now explained by an example of a case of voltage monitoring with reference to FIGS. 10, 11 and 12. As stated in the previous embodiments, the active power values and the reactive power values of the respective sections which have been calculated by the section load predicting device 16, are inputted to the calculating device 61 through the LAN15.

Figure 6:
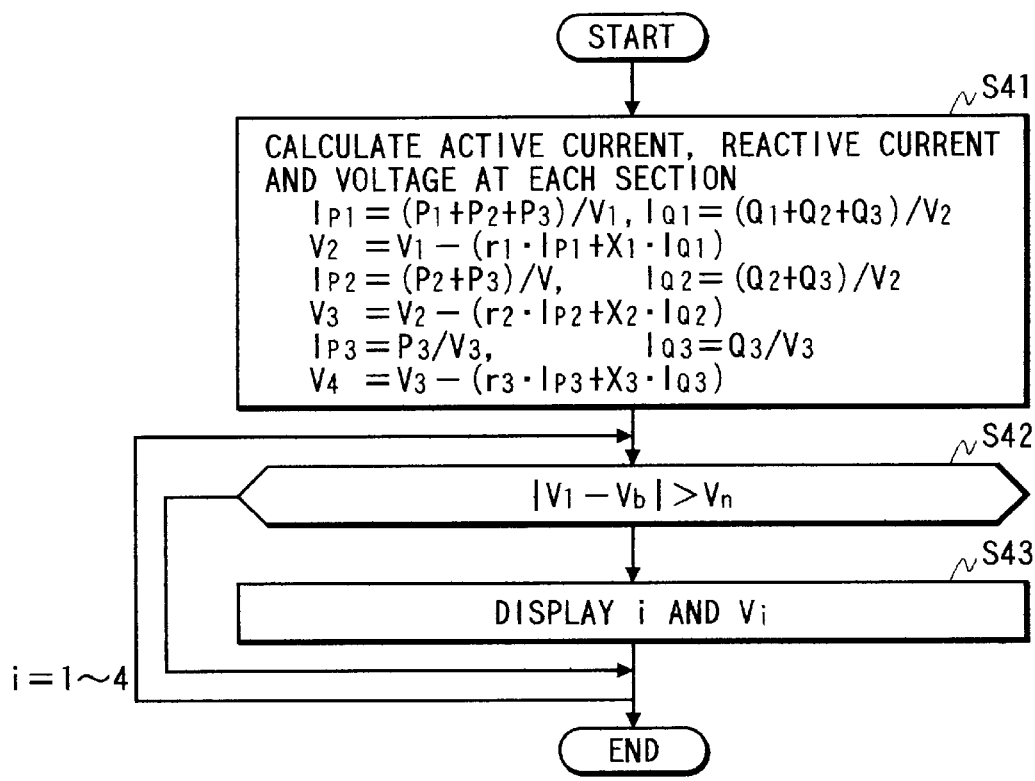
FIG. 6 is a diagram of the operation of a power system supervisory control device in the apparatus of FIG. 1.

In the calculating device 61, the voltage value Vi in the section i is calculated by the calculation shown in step S41 of FIG. 6 above, and inputted to the supervisory device 62. In the supervisory device 62, the voltage value of each section is converted to a voltage penalty value by a voltage deviation penalty function as shown in FIG. 11. Here, the voltage deviation penalty function is defined as a function showing the extent to which the voltage value is problematic in actual operation, wherein the X-axis denotes a deviation ratio of the section voltage Vi with respect to the reference voltage Vb (for instance, distribution reference voltage of 6600 V), and the Y-axis denotes the voltage penalty value Pvi showing a value of from 0 to 1.0.

In the example of FIG. 11, a case is assumed wherein the allowable voltage range provided to an electrical consumer device is approximately ±5%, and the penalty value is set to increase sharply if the section voltage Vi deviates from the reference voltage Vb by more than ±5%. That is, the penalty value has a comparatively small value up to about half of the allowable limit, but after that it rapidly increases.

The penalty function can be arbitrarily determined to be different from that shown in FIG. 11. In that case, the value is determined to be small in the section wherein the necessity of improvement is small in view of the operation of the distribution feeder and the penalty increases sharply in the section wherein the necessity of improvement is large. FIG. 12 shows an example of the voltage penalty values of the respective sections which have been calculated in accordance with the penalty function of FIG. 11.

The distribution-feeder-wise supervising device 63 calculates a performance index or improvement index indicating the extent of a problem of a distribution feeder, which is at a level by one rank above a section, in relation to voltage. In the distribution-feeder-wise supervising device 63, a mean of voltage penalty values of the sections belonging to the distribution feeder 4a is calculated by the following equation.

$$(0.4+0.3+0.2+0.1)/4=0.25 \qquad \text{(equation 7)}$$

The first reason for calculating the above value by averaging the penalty value of the sections belonging to the same distribution feeder is that, when a measure for improvement of performance of each distribution feeder is taken, the search for a cause or measure for improvement is facilitated by calculating the necessity of improvement with respect to each distribution feeder. The second reason is that, since the voltage of the distribution feeder is determined by the passing active and reactive currents and shows a characteristic tendency with respect to each distribution feeder, it can be expected that a portion of the network necessitating improvement is clarified by calculating the mean value of penalties of the sections belonging to the same distribution feeder.

In this way, also with respect to the other distribution feeders 4b and 4c belonging to the bank #1 and the distribution feeders 4d, 4e and 4f belonging to the bank #2, the mean voltage penalty values are calculated as 0.20, 0.39, 0.74, 0.78 and 0.83, respectively. The penalty values of the respective distribution feeders are shown at the right hand side of the respective distribution feeders of FIG. 12.

In the bank-wise supervising device 64, the penalty mean value as for the bank as a whole is calculated by further averaging the penalty values of the respective distribution feeders belonging to the same bank which have been calculated by the supervising device 63. As a result, as shown at the right end of FIG. 12, the penalty mean values of the bank are calculated as 0.28 for #1 and 0.71 for bank #2.

At this stage, when only the values which are obtained by averaging are calculated, as the penalty values, only the total indices of respective banks remain, and individual characteristics which are different from the total tendency are lost. Therefore, the penalty values of the sections belonging to the same distribution feeder are compared by the supervising device 63, and the section penalty value having a maximum (worst) value is also memorized. Similarly, the maximum distribution feeder penalty value is also memorized in the bank-wise supervising device 64.

Further, in searching for the cause of the voltage reduction or the like, the input end voltage of the bank is used. Therefore, the penalty value of the input voltage of the bank is also recorded in the bank-wise supervising device 64. In case of the bank #1, the worst penalty value is 0.39 (distribution feeder 4c) with regard to the distribution feeders, 0.70 (distal end of the distribution feeder 4c) with regard to the sections, and 0.40 with regard to the input voltage. In this specification, this operation wherein the information of the higher levels are summarized by a small amount of data while also holding important characteristics as much as possible in this way for effectively sampling the portions necessitating improvement predominantly as a whole, is called "abbreviation".

The penalty mean values and the penalty worst values of the monitoring devices 62, 63, 64 are taken to the sampling device 66. Next, the penalty mean values of the two banks are compared, and since the penalty mean value of 0.71 for the bank #2 is larger than the penalty mean value of 0.28 of the bank #1, the bank #2 is sampled as the bank which should be improved predominantly. Further, the worst penalty values of the bank #2 are 0.83 and 0.90 respectively for the distribution feeders and the sections, and these values as well as the mean value 0.71 of the bank #2 are large, and therefore, it is determined that the whole bank is problematic with regard to voltage.

Next, since the penalty value of the input point voltage is as large as 0.7, it is predicted that the voltage of the whole bank #2 is reduced by the lowering of the input point voltage. As a result, in the display device 18, the bus voltage of the bank #2 is outputted and displayed as a portion which should be improved predominantly. In this operation when the penalty value is not less than 0.5, it is determined to be large.

With respect to the bank #1, there is a value of 0.7 in the worst penalty values at the section level. However, this is known from the information of the bank which has been obtained as a result of the abbreviation, and therefore, in this case, the section showing the worse penalty value is searched, and the distal end section of the distribution feeder 4c is displayed on the display device 18 as a portion which should be improved predominantly along with the section voltage value. Also at the level of the distribution feeders, when there is a portion having a large penalty value, the corresponding distribution feeder is sampled by the same treatment, and the voltage values of the distribution feeder and the respective sections belonging thereto are displayed on the display device 18.

In this embodiment of the present invention, since the monitoring control is performed predominantly from the levels of the bank having a mutually intense electrical independence by using the information abbreviated with respect to the levels corresponding to the distribution system, a portion which should, with priority, be improved with respect to the voltage can be effectively sampled out.

In the above explanation, abbreviation is performed by simply calculating the mean values. However, it is feasible that a weighting may be made with respect to the load amount and the importance of each section in the averaging operation. Further, when the dispersion of the penalty values is calculated along with the mean, the dispersion will be a yardstick for knowing variations of the respective distribution feeder voltages and the respective section voltages.

Although an explanation has been made with respect to the voltage, portions which should be improved first with respect to loss or harmonics can be sampled out by investigating the distribution of currents (and also respective components of active and reactive currents other than apparent current) and the distribution of the respective harmonic components with regard to each section, and by abbreviating the data at the levels of the distribution feeder and the bank, similarly.

Further, the electricity amounts of the respective sections of the distribution feeder may directly be measured and may directly be employed as the inputs to the hierarchy type system monitoring device 60, without using the outputs of the section load predicting device 16 as stated above.

In the embodiments previously explained, an example has been illustrated in which the central station, and the remote stations are connected through the communication lines to transmit and receive communications. However, by using the distribution system synchronizing transmission process as disclosed in Japanese Patent Publication No. 24328/1994, it is possible to make communication between the central station and the remote stations using a distribution line as a medium of a control signal. In such a system, it is not necessary to provide a new cable other than the existing distribution feeders, and is possible to constitute a system with high reliability with less cost.

In summary, as explained above, the power distribution system monitoring system in the embodiments of this invention on the one hand actually measures at real time a value such as the electricity amount at for example the input point of the distribution feeder from the bus and the electricity amount passing between the specific electric facility and the distribution feeder, and on the other hand, predicts values such as the electricity amounts of the plurality of sections of the distribution feeder. Therefore, the behavior of the system can accurately be predicted using a minimum amount of data, and the distribution system can be monitored for optimal control.

Further, there is an effect such that an evaluation amount is calculated with a distribution feeder as a unit and a bank as a unit which comprises a higher level conception on the basis of an electricity amount in sections, and a range in which the evaluation amount with the distribution feeder unit and the bank unit deviate from a reference evaluation amount is monitored, so that portions which need to be improved preferentially in the entire system can be found.

While this invention has been illustrated by several embodiments, it is not limited to them, and variations, modifications and improvements are possible, within the inventive concept.

We claim:

1. An electrical power distribution monitoring system, for a power distribution line having a plurality of sections with a plurality of electrical loads connected to the power distribution line to form a power distribution network, said monitoring system comprising:
   (a) at least one first power sensor arranged to measure power being supplied to said power distribution line at a power input end of said power distribution line;
   (b) at least one second power sensor arranged to measure power passing between said power distribution line and at least one specific one of said electrical loads;
   (c) a data store containing data set in advance relating to power consumption of said plurality of sections; and
   (d) calculating means arranged to estimate electrical values for at least one of said sections of said power distribution line in dependence on present electrical power data measured by said first power sensor and said second power sensor, and in dependence on said data in said data store.

2. An electrical power distribution monitoring system according to claim 1, wherein said at least one first power sensor measures total power being supplied to said power distribution line.

3. An electrical power distribution monitoring system according to claim 1, wherein said at least one second power sensor comprises a power sensor device arranged to measure power passing in a branch of said power distribution network connecting said at least one specific electrical load to said power distribution line.

4. An electrical power distribution monitoring system according to claim 1, wherein said at least one second power sensor comprises two power sensor devices arranged to measure power passing in said power distribution line at respective points in said power distribution line, between which said at least one specific electrical load is connected to said power distribution line, thereby to provide a measurement of power passing between said power distribution line and said at least one specific electrical load.

5. An electrical power distribution monitoring system according to claim 1, wherein said at least one specific load, on average, consumes at least 5% of the total consumption by all of the electrical loads connected to said power distribution line.

6. An electrical power distribution monitoring system according to claim 1, wherein said calculating means is arranged to use data from said data store for predicting consumption by all of the electrical loads connected to said power distribution line except said at least one specific electrical load.

7. An electrical power distribution monitoring system according to claim 1, wherein said electrical loads comprise a plurality of electricity-consuming buildings.

8. An electrical power distribution monitoring system according to claim 1, wherein said calculating means calculates the difference of said at least one first power sensor and said at least one second power sensor, and calculates power consumption of every one of said sections by distributing calculated electrical power data.

9. An electrical power distribution monitoring system according to claim 1, wherein said at least one second power sensor includes a power sensor arranged to measure power passing in a branch of said network connecting said specific load to said power distribution line.

10. An electrical power distribution monitoring system according to claim 1, wherein said calculating means is arranged to calculate estimated power values in each of a plurality of said sections of said line.

11. An electrical power distribution monitoring system according to claim 1, wherein said data in said data store comprises, as said data relating to past power consumption, data relating to past power consumption of each of said sections of said power distribution line.

12. An electrical power distribution monitoring system according to claim 1, wherein said calculating means is arranged further to calculate, from sections, the degree of deviation of said estimated electrical values from a predetermined standard value or values.

13. An electrical power distribution monitoring system, for a power distribution line having a plurality of sections and having a power input at an input end, there being a plurality of electrical loads connected to the power distribution line, said monitoring system comprising:
   (a) measurement means for measuring an electrical value at at least one of (i) a point on said power distribution line, (ii) a selected one of said electrical loads, and (iii) a selected group of said electrical loads,
   (b) a data store containing data relating to past power consumption by electrical loads connected to said power distribution line, and
   (c) calculating means connected to said measurement means and to said data store and arranged to calculate estimated electrical values in at least one of said sections of said power distribution line from both of at least one currently measured electrical value obtained by said measurement means and said data in said data store;

wherein said measurement means comprises at least a first measurement device for measuring said at least one currently measured electrical value in a portion of said power distribution line closer to said input end thereof than all of said electrical loads.

14. An electrical power distribution monitoring system according to claim 13, wherein said measurement means further comprises a second measurement device arranged to measure, as said at least one currently measured electrical value, at least the current passing between said power distribution line and said selected one of said electrical loads.

15. An electrical power distribution monitoring system according to claim 14, wherein said selected one of said electrical loads, on average, consumes at least 5% of total power consumption by all of the electrical loads connected to said power distribution line.

16. An electrical power distribution monitoring system according to claim 13, wherein said measurement means further comprises a plurality of second measurement devices arranged in said power distribution line to measure, as said at least one currently measured electrical value, at least the current passing between said power distribution line and said selected one or selected group of said electrical loads.

17. An electrical power distribution monitoring system according to claim 13, wherein said calculating means is arranged to calculate estimated power values in each of plural ones of said plurality of sections of said power distribution line.

18. An electrical power distribution monitoring system according to claim 13, wherein said data store contains, as said data relating to past power consumption, data relating to past power consumption of each said section of said power distribution line.

19. An electrical power distribution monitoring system according to claim 13, wherein said calculating means is arranged further to calculate, from estimated electrical values in plural ones of said plurality of sections, the degree of deviation of said estimated electrical values from respective predetermined standard values.

20. An electrical power distribution monitoring system, for a power distribution network having at least one bus connected to a higher level power network through a transformer and at least one bank comprising a plurality of distribution lines each composed of a plurality of sections and connected to one of said at least one bus;

said monitoring system comprising:

for each said distribution line, a first sensor device for measuring the electricity transmission amount at an input end of the distribution line from one of said at least one bus;

for each said distribution line, at least one second sensor device for measuring the electricity amount passing between the distribution line and at least one specific electrical load connected thereto;

administrative information calculating means for calculating load distribution coefficients of each said section of each said distribution line from data of past power consumption of each said section;

section predicting means for calculating a predicted electrical value of each said section of each said distribution line from outputs of said first and second sensor devices and said load distribution coefficients; and network supervising means for calculating deviations of said predicted electrical valves from a predetermined value or values.

21. An electrical power distribution monitoring means according to claim 20, wherein said predicted electrical values calculated by said section predicting means are values of electrical power in the respective sections, and wherein said network supervising means comprises:

means for calculating a section voltage value from the predicted electrical power values of each said section;

section-wise supervising means for calculating a voltage deviation from a predetermined value for each respective section voltage value;

distribution line supervising means for calculating a distribution line performance index of each distribution line from the voltage deviation of each section of the respective distribution line;

bank supervising means for calculating a bank normal index of the bank from said distribution line performance index of each distribution line belonging to the same bank; and bank analysis means for sampling one or more portions of said network suffering voltage deviation, by reference to said voltage deviations, said distribution line performance index, and said bank normal index.

22. An electrical power distribution monitoring means according to claim 21, wherein said distribution line performance index is composed of a first mean value which is a mean value of said voltage deviations of said sections of the distribution lines and a maximum value of said voltage deviations; and said bank normal index is composed of a second mean value which is a mean value of said first mean values of the respective distribution lines belonging to the bank, a maximum value of said first mean values, a maximum value of said voltage deviations, and voltages of the input points of the distribution lines from said bus.

23. A method of monitoring an electrical power distribution network which has a power distribution line having a plurality of sections and a power input at an input end, there being a plurality of electrical loads connected to said power distribution line, said method comprising the steps of:

(a) measuring power being supplied to said input end of said power distribution line;

(b) measuring power passing between said power distribution line and at least one specific one of said electrical loads; and (c) calculating, from measurements of said step (a) and step (b) and from data set in advance relating to power consumption by electrical loads connected to said power distribution line, estimated electrical power data of at least one of said sections of said power distribution line.

24. A method according to claim 23, wherein step (c) calculates said estimated electrical power data of a plurality of said sections of said power distribution line, and the method further comprises the step of comparing said estimated electrical power data of each section with a predetermined standard value.

25. An electrical power distribution monitoring system, for a power distribution network having at least one bus connected to a higher level power network through a transformer and at least one bank comprising a plurality of distribution lines each composed of a plurality of sections and connected to said at least one bus, the system comprising:

means for obtaining electricity amounts of said sections;

means for calculating an electricity amount with respect to at least one said distribution line on the basis of the obtained electricity amounts;

means for calculating an electricity amount with respect to said bank;

means for comparing said electricity amounts calculated with respect to said at least one distribution line and said bank with preset reference electricity amounts for a distribution line and a bank; and means for supervising a state in which the electricity amounts calculated with respect to said at least one distribution line and said bank deviate from the reference electricity amounts.

26. An electrical power distribution monitoring system according to claim 25, wherein said means for calculating an electricity amount with respect to said at least one distribution line calculates voltage penalty values from voltage values for each of a plurality of sections of the at least one distribution line and calculates said electricity amount for the at least one distribution line from said voltage penalty values.

27. An electrical power distribution monitoring system according to claim 26, wherein said means for calculating an electricity amount with respect to said at least one distribution line further stores a worst value of the voltage penalty functions of the respective sections thereof.

28. An electrical power distribution monitoring system according to claim 26, wherein said means for calculating an electricity amount with respect to said bank obtains a plurality of said electricity amounts with respect to respective distribution lines of said bank, and calculates said electricity amount for said bank therefrom.

29. An electrical power distribution monitoring system according to claim 28, wherein said means for calculating an electricity amount with respect to said bank further stores a worst value of said electricity amounts of the respective distribution lines.

30. An electrical power distribution monitoring system according to claim 25, wherein said means for calculating an electricity amount with respect to said bank obtains a plurality of said electricity amounts with respect to respective distribution lines of said bank, and calculates said electricity amount for said bank therefrom.

31. An electrical power distribution monitoring system according to claim 30, wherein said means for calculating an electricity amount with respect to said bank further stores a worst value of said electricity amounts of the respective distribution lines.

* * * * *